(12) United States Patent
Huang et al.

(10) Patent No.: US 12,367,994 B1
(45) Date of Patent: Jul. 22, 2025

(54) MAGNETIC MICROCAPSULE, PREPARATION METHOD THEREOF, AND MAGNETIC FILM

(71) Applicant: My Superboard Limited, Shenzhen (CN)

(72) Inventors: Yongwen Huang, Shenzhen (CN); Zhaoyu Chen, Shenzhen (CN); Shunzhi Yao, Shenzhen (CN); Hongfei Huang, Shenzhen (CN)

(73) Assignee: My Superboard Limited, Shenzhen (CN)

( * ) Notice: Subject to any disclaimer, the term of this patent is extended or adjusted under 35 U.S.C. 154(b) by 0 days.

(21) Appl. No.: 19/026,554

(22) Filed: Jan. 17, 2025

(30) Foreign Application Priority Data

Jul. 31, 2024 (CN) .......................... 202411039100.5
Jan. 15, 2025 (CN) .......................... 202510060211.2

(51) Int. Cl.
  *H01F 1/36*  (2006.01)
  *B01J 13/10*  (2006.01)
  *H01F 1/00*  (2006.01)
  *H01F 1/03*  (2006.01)
  *H01F 1/057*  (2006.01)
  (Continued)

(52) U.S. Cl.
  CPC ............ *H01F 1/0063* (2013.01); *B01J 13/10* (2013.01); *H01F 1/0315* (2013.01); *H01F 1/057* (2013.01); *H01F 10/126* (2013.01); *H01F 10/20* (2013.01); *H01F 10/28* (2013.01); *H01F 10/30* (2013.01)

(58) Field of Classification Search
  CPC . H01F 1/36; H01F 1/342; H01F 1/344; H01F 1/37; H01F 1/0063; H01F 1/0315; H01F 1/057; H01F 10/126; H01F 10/20; H01F 10/28; H01F 10/30; B01J 13/10; B01J 13/02; B01J 13/025
  See application file for complete search history.

(56) References Cited

FOREIGN PATENT DOCUMENTS

CN        1140262 A     1/1997
CN      105730082 B     8/2018
(Continued)

OTHER PUBLICATIONS

Machine translaion of CN1140262A, 28 pages. (Year: 1997).*
Machine translation of CN117732384A, 20 pages. (Year: 2024).*
Machine translation of JP2008-122989A, 19 pages. (Year: 2008).*

*Primary Examiner* — Matthew E. Hoban
*Assistant Examiner* — Lynne Edmondson
(74) *Attorney, Agent, or Firm* — Andrew C. Cheng

(57) ABSTRACT

A magnetic microcapsule, preparation method thereof and a magnetic film are disclosed, relating to microcapsule technology. The microcapsules use a combination of cationic and anionic polymers as the shell material, forming spindle-shaped, durable spheres to enhance strength. The core material contains at least two types of magnetic particles with different strengths, allowing adjustable magnetic forces to improve writing, erasure, and contrast. It also includes non-magnetic particles, an oil-based solvent, and a suspension stabilizer, forming a stable cross-linked network and electrostatic adsorption layer to prevent sedimentation and ensure smooth writing and lasting marks. The resulting magnetic film offers excellent responsiveness, enabling quick and thorough erasure by adjusting the magnetic pen's force and frequency.

18 Claims, 17 Drawing Sheets

(51) Int. Cl.
*H01F 1/34* (2006.01)
*H01F 1/37* (2006.01)
*H01F 10/12* (2006.01)
*H01F 10/20* (2006.01)
*H01F 10/28* (2006.01)
*H01F 10/30* (2006.01)

(56) References Cited

FOREIGN PATENT DOCUMENTS

| | | |
|---|---|---|
| CN | 117732384 A | 3/2024 |
| JP | 2008122989 A | 5/2008 |

* cited by examiner

MAGNETIC MICROCAPSULE, PREPARATION METHOD THEREOF, AND MAGNETIC FILM

TECHNICAL FIELD

The present invention relates to the field of microcapsule technology, and more particularly, to a magnetic microcapsule, a preparation method thereof, and a magnetic film.

BACKGROUND

With the advancement of technology, magnetic writing boards have adopted microcapsule encapsulation technology to replace traditional honeycomb structures. The size of microcapsules is significantly smaller than the small chambers of traditional honeycomb structures, leading to a substantial improvement in handwriting resolution and clarity. However, in practical applications, issues such as insufficient contrast, blackness, and stability still persist.

To address these challenges, the patent application with publication number CN117732384 discloses a magnetic microcapsule and preparation method thereof. In this application, the shell material of the magnetic microcapsule is the reaction product of gelatin and an anionic polymer, while the core material consists of a suspension mixture of modified non-magnetic particles, modified magnetic particle agglomerates, and a solvent. These agglomerates are used to fabricate magnetic microcapsules, which, when applied to writing panels, improve the clarity and contrast of displayed handwriting.

However, the wall material formed by the electrostatic interaction between gelatin and other anionic polymers tends to exhibit flexibility after crosslinking. When using common curing agents such as transglutaminase for crosslinking, it is difficult to enhance the strength of the wall material. When applied to magnetic handwriting boards, excessive writing force could easily cause the magnetic microcapsules to rupture, thereby compromising clarity.

Additionally, to improve the suspension and blackness of magnetic particles, the application CN117732384 with publication number CN117732384 employs an oleophilic modification method for magnetic particles. This approach increases production steps, is only applicable to magnetic particles with small diameters, and the modified magnetic particles exhibit low stability in the system, which may adversely affect product quality.

SUMMARY

The present disclosure provides a magnetic microcapsules, a preparation method thereof, a magnetic film, and a writing board to address the issues of insufficient blackness, contrast, and stability in magnetic microcapsule-based writing boards in the prior art.

In a first aspect, an embodiment of the present disclosure provides a magnetic microcapsule, wherein the magnetic microcapsule comprises a wall material and a core material, the wall material is a mixture of an anionic polymer and a cationic polymer, the core material is a mixture of magnetic particles, non-magnetic particles, the cationic polymer includes one or both of gelatin and ε-poly-L-lysine, the anionic polymer comprises one or more of sodium carboxymethyl cellulose, arabic gum, and sodium alginate, the magnetic particle includes nano-ferric oxide, and also include one or two of oleophilic nano-ferrites and nano-neodymium iron boron, the magnetic strength of nano-ferric oxide, nano-ferrites, and nano-neodymium iron boron are different from one another;

In a second aspect, an embodiment of the present disclosure provides a preparation method of magnetic microcapsule, comprising:

Adding magnetic particles and non-magnetic particles into an oily solvent at a predetermined mass ratio to obtain an oil-phase mixture;

Adding a suspension stabilizer to the oil-phase mixture and dispersing the mixture at a predetermined dispersion speed to obtain a core material suspension;

Adding a cationic polymer and an anionic polymer into deionized water at a predetermined mass ratio to obtain an aqueous solution;

Adding the core material suspension into the aqueous solution, and stirring the mixture to disperse the core material suspension, thereby obtaining a dispersion;

Adding an acid-base regulator to the dispersion to adjust the pH to a predetermined value, reacting for a first predetermined time, then adding a curing agent, and continuing the reaction for a second predetermined time to obtain magnetic microcapsules.

In a third aspect, an embodiment of the present disclosure provides a magnetic film, wherein the magnetic film comprises: a PET substrate layer, a rubber-based adhesive layer positioned above the PET substrate layer, a mixture layer of water-based adhesive and microcapsules positioned above the rubber-based adhesive layer; and, an AG PET film layer positioned above the mixture layer of water-based adhesive and magnetic microcapsules, wherein the magnetic microcapsules are either the magnetic microcapsules described in any embodiment of the first aspect of the magnetic microcapsules prepared by the preparation method described in the second aspect.

Beneficial Effects:

Embodiments of the present invention provide magnetic microcapsules that utilize a combination of anionic and cationic polymers as the wall material to enhance the strength of the microcapsules, thereby preventing wall rupture during writing and ensuring clear handwriting. The magnetic particles consist of nano-ferrites or nano-neodymium iron boron with different magnetic strengths, as well as nano-ferric oxide. By adjusting the proportion of these magnetic particles, the magnetic force can be controlled, facilitating writing and erasure while improving handwriting blackness and contrast.

Furthermore, using oily solvents such as white oil and paraffin allows for the adjustment of solution polarity, ensuring the stable and uniform dispersion of magnetic and non-magnetic particles in the oil phase. By adding suspension stabilizers such as phthalates and polyamide wax, a stable crosslinked network structure and electrostatic adsorption layer are formed in the oil phase, preventing particle sedimentation and aggregation, thereby ensuring smooth writing and long-lasting marks.

The magnetic microcapsules significantly enhance the performance of magnetic films and writing boards in terms of blackness, contrast, and stability, making them better suited for various applications in education, office work, household use, and commercial settings.

BRIEF DESCRIPTION OF THE DRAWINGS

To clarify the technical solutions of the embodiments in the present disclosure, the accompanying drawings used in the embodiments will be briefly introduced. For those

DETAILED DESCRIPTION

Figure 1:
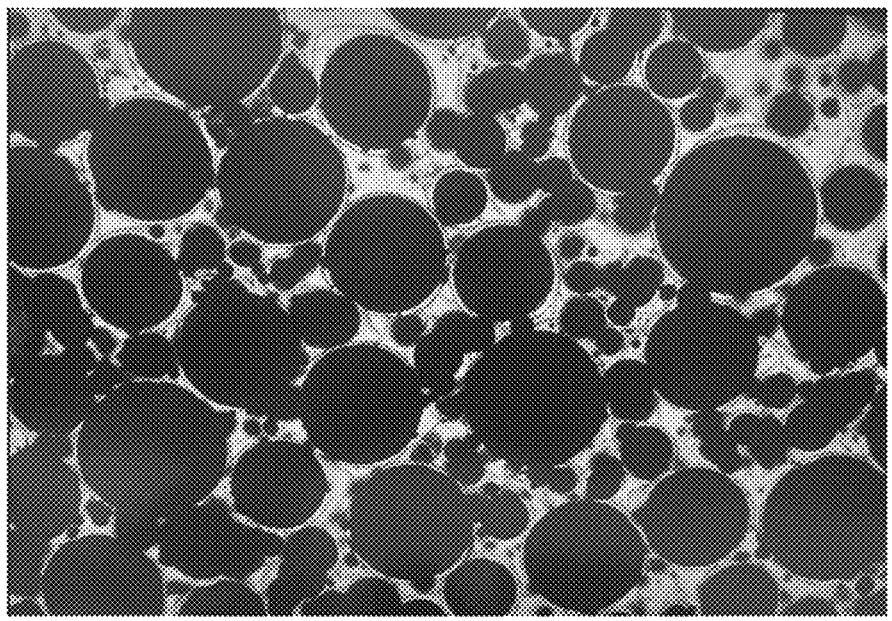
FIG. 1 is an optical microscope image of the magnetic microcapsules according to an embodiment of the present invention.

The following provides a detailed description of various features and exemplary embodiments of this invention. To make the objectives, technical solutions, and advantages of the invention clearer, we will elaborate further on the invention with reference to accompanying drawings and examples. It should be understood that the specific embodiments described here are solely intended to illustrate the invention, and are not intended to define its limits. Those skilled in the art will recognize that the invention can be implemented without requiring some of these specific details. The descriptions of the embodiments are only meant to provide a better understanding of the invention by illustrating its examples.

It should also be noted that relational terms such as "first" and "second" are used herein solely to distinguish one entity or operation from another, without necessarily implying any actual relationship or order between such entities or operations. Furthermore, terms such as "comprising," "including," or any variations thereof, are intended to cover a non-exclusive inclusion, such that a process, method, article, or device that comprises a list of elements includes not only those elements but may also include other elements not expressly listed, or elements inherent to such a process, method, article, or device. Elements defined by the phrase "comprising . . . " do not exclude the presence of additional identical elements within the process, method, article, or device.

Embodiment 1

In a first aspect, an embodiment of the present invention provide a magnetic microcapsule, wherein the magnetic microcapsule comprises a wall material and a core material. The wall material is a mixture of an anionic polymer and a cationic polymer, and the core material is a mixture of magnetic particles, non-magnetic particles, an oily solvent, and a suspension stabilizer. Specifically:

The cationic polymer includes one or both of gelatin and ε-poly-L-lysine;

The anionic polymer includes one or more of sodium carboxymethyl cellulose, arabic gum, and sodium alginate;

The magnetic particles include nano-ferric oxide and one or both of oleophilic nano-ferrites or nano-neodymium iron boron (NdFeB);

The non-magnetic particles are oleophilic nano-titanium dioxide (i.e., oleophilic nano-titanium white).

In an embodiment, the core material further comprises the oil-phase anti-settling agent, which comprises dodecyltrimethoxysilane and/or hexadecyltrimethoxysilane, bentonite, dilute hydrochloric acid, sodium hydroxide In another embodiment, the oil-phase anti-settling agent comprises KH550 (γ-aminopropyltriethoxysilane) and/or KH560 (3-glycidoxypropyltrimethoxysilane), bentonite, dilute hydrochloric acid, sodium hydroxide;

Preferably, the preparation of the oil-phase anti-settling agent comprises the following steps:

Step 1: Add 5 parts of bentonite to 94.8 parts of water, and stir magnetically at 500 rpm at room temperature for 100 minutes.

Step 2: Add 0.1 part of KH550 to the solution treated in Step 1 and continue stirring at 500 rpm for 5 minutes.

Step 3: Adjust the pH of the solution treated in Step 2 to 4.5-5 using dilute hydrochloric acid, and continue stirring at 500 rpm for 30 minutes.

Step 4: Adjust the pH of the solution treated in Step 3 to 8-8.5 using sodium hydroxide, heat the solution in a water bath to 60-70° C., and continue stirring at 500 rpm for 60 minutes.

Step 5: Filter and dry the solution treated in Step 4 to obtain modified bentonite, which is used as the oil-phase anti-settling agent.

When the wall of the microcapsule is damaged, the magnetic particles are unable to migrate upward in the dispersed fluid under the traction of a magnetic writing pen, leading to reduced handwriting resolution and the issue of unclear marks. Therefore, in the aforementioned embodiments, a mixture of anionic and cationic polymers is used as the wall material to encapsulate the core material and form a tough, spindle-shaped sphere. This significantly enhances the strength of the wall material, making the microcapsule less prone to damage during writing. The increased strength allows the microcapsules to better protect the magnetic particles inside, preventing the particles from failing to migrate effectively due to wall rupture, thereby ensuring clear and stable handwriting marks.

At the same time, no additional dispersing agents are required during the preparation of the microcapsules, which saves raw materials and reduces costs.

In the aforementioned embodiment, nano-ferric oxide, nano-ferrites, or nano-neodymium iron boron (NdFeB) with different magnetic strengths are primarily used as the magnetic particles. By mixing nano-ferric oxide, nano-ferrites, or nano-NdFeB in varying proportions, the magnetic force can be adjusted, facilitating both writing and erasure. Additionally, adjusting the proportion of different magnetic particles can also control the blackness, and consequently, the writing contrast. For example, using magnetic particles with higher blackness or increasing their proportion can enhance the blackness of the writing, making the marks deeper and more distinct. Alternatively, adjusting the proportion of different magnetic particles in a balanced manner can increase the contrast between the handwriting and the background, thus improving the visual effect of the writing. The magnetic microcapsules of the present embodiment significantly improve the writing board's performance in terms of writing blackness, contrast, and stability.

Preferably, the nano-ferrites in the magnetic particles include one or more of nano-manganese-zinc ferrite, nano-nickel-zinc ferrite, nano-magnesium-manganese ferrite, nano-aluminum-manganese ferrite, etc. In other embodiments, they may also include other nano-ferrites or ferrites.

Nano-manganese-zinc ferrite has high magnetic permeability and saturation magnetization, enabling the magnetic microcapsules to respond quickly under an external magnetic field, thereby improving fluxibility.

Nano-nickel-zinc ferrite, with its high resistivity and low magnetic hysteresis loss, maintains excellent magnetic properties over a wide frequency range, allowing the microcapsules to respond rapidly under magnetic fields of varying frequencies.

Nano-magnesium-manganese ferrite maintains stable magnetic properties under different temperature conditions, ensuring that the microcapsules respond quickly across various temperatures. Additionally, nano-magnesium-manganese ferrite has a lower density, which reduces the overall mass of the microcapsules and improves fluxibility, making it suitable for lightweight and high-response applications.

Nano-aluminum-manganese ferrite offers high hardness and wear resistance, enhancing the mechanical strength of the microcapsules and ensuring stable fluxibility under high-frequency use. By adjusting the ratio of aluminum to manganese, the magnetic properties of the ferrite can be precisely controlled, thereby optimizing the fluxibility of the microcapsules.

Different types of nano-ferrites have distinct magnetic properties, which can significantly improve the response speed and sensitivity of the magnetic microcapsules in an external magnetic field, meeting the requirements for fast writing and erasure. The excellent mechanical strength, wear resistance, and temperature stability of nano-ferrites ensure the long-term stability and efficient response of the magnetic microcapsules in various environments. By selecting different nano-ferrites, the fluxibility and stability of the magnetic microcapsules can be optimized according to specific application needs, thereby enhancing their overall performance and application effectiveness.

Preferably, the oily solvent is one or more of white oil, caprylic/capric triglyceride, paraffin, dioctyl terephthalate, turpentine, transformer oil, and poly-α-olefin synthetic oil. The components in the oily solvent, such as white oil, caprylic/capric triglyceride, paraffin, dioctyl terephthalate, turpentine, transformer oil, and poly-α-olefin synthetic oil, effectively adjust the polarity of the solution, ensuring the stable and uniform dispersion of magnetic and non-magnetic particles in the system and forming a stable oily phase environment. This enhances the performance and service life of the writing board.

Preferably, the oily solvent is a mixture of white oil and paraffin. The mixture of white oil and paraffin provides a chemically stable and structurally stable oily phase environment, ensuring the uniform dispersion and stable presence of the magnetic and non-magnetic particles throughout the system. The film-forming properties of paraffin and the lubricating properties of white oil together enhance the structural strength of the microcapsules, while maintaining good fluidity, making it suitable for writing and erasing applications.

Preferably, the suspension stabilizer includes one or more of phthalate esters, polyamide wax, polysiloxane, oleic acid sorbitan, sorbitan monostearate, silica, magnesium aluminum silicate, and magnesium lithium silicate. More preferably, the suspension stabilizer is a mixture of polyamide wax and oleic acid sorbitan. Polyamide wax has good dispersibility and stability, and can form a networked structure that prevents particle settling. Oleic acid sorbitan is an excellent emulsifier and stabilizer, enhancing the stable dispersion of particles.

In other embodiments, the suspension stabilizer may also be a mixture of phthalate esters and polyamide wax, or a mixture of polysiloxane and silica. The suspension stabilizer can form a stable networked structure in the oily solvent, which helps prevent the settling or agglomeration of magnetic and non-magnetic particles, ensuring their uniform dispersion in the oily phase. Additionally, the suspension stabilizer can form a stable electrostatic adsorption layer on the particle surface. The formation of this electrostatic layer aids in improving particle dispersion, allowing magnetic and non-magnetic particles to be evenly dispersed in the oily phase. The uniformly dispersed particles contribute to smoother writing. Furthermore, the stable networked structure and electrostatic adsorption layer ensure the particles remain more stable after writing, allowing the handwriting to be more durable, thereby preventing fading or blurring. This property is especially important for applications where written content needs to be preserved for an extended period.

Figure 2:
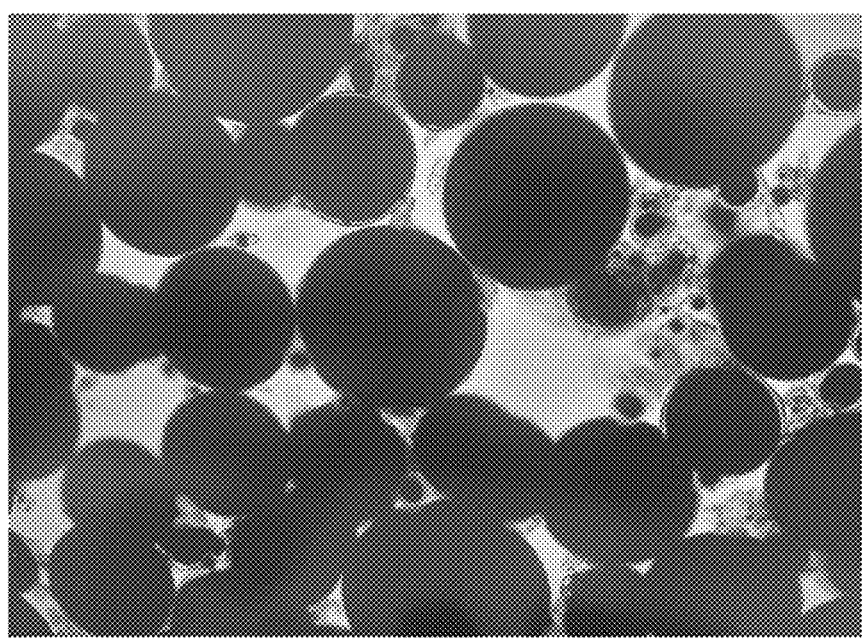
FIG. 2 is an optical microscope image of the magnetic microcapsules in the prior art.

As shown in FIG. 1, the image of the magnetic microcapsules in the embodiment of the present invention was obtained under an optical microscope. As shown in FIG. 2, the image of other existing magnetic microcapsules is presented for comparison. In FIG. 1, the wall material of the magnetic microcapsules is primarily composed of a composite of gelatin (cationic polymer) and arabic gum (anionic polymer). By altering the ratio of the cationic polymer (such as gelatin) and the anionic polymer (such as arabic gum), the conglomeration rate and viscosity of the magnetic microcapsules can be adjusted.

Comparing FIGS. 1 and 2, it can be seen that the wall material thickness of the magnetic microcapsules provided in the embodiment of the present invention (FIG. 1) is significantly greater than that of the magnetic microcapsules shown in FIG. 2, ensuring that the magnetic microcapsules are less likely to break during the writing process. Additionally, the magnetic microcapsules in FIG. 1 predominantly exhibit a spindle-shaped morphology. This spindle-like shape allows the magnetic microcapsules to withstand greater writing strength (on average, they can withstand writing strengths of 700-800 g, whereas most existing magnetic microcapsules can only withstand up to 500 g of writing strength).

Figure 3:
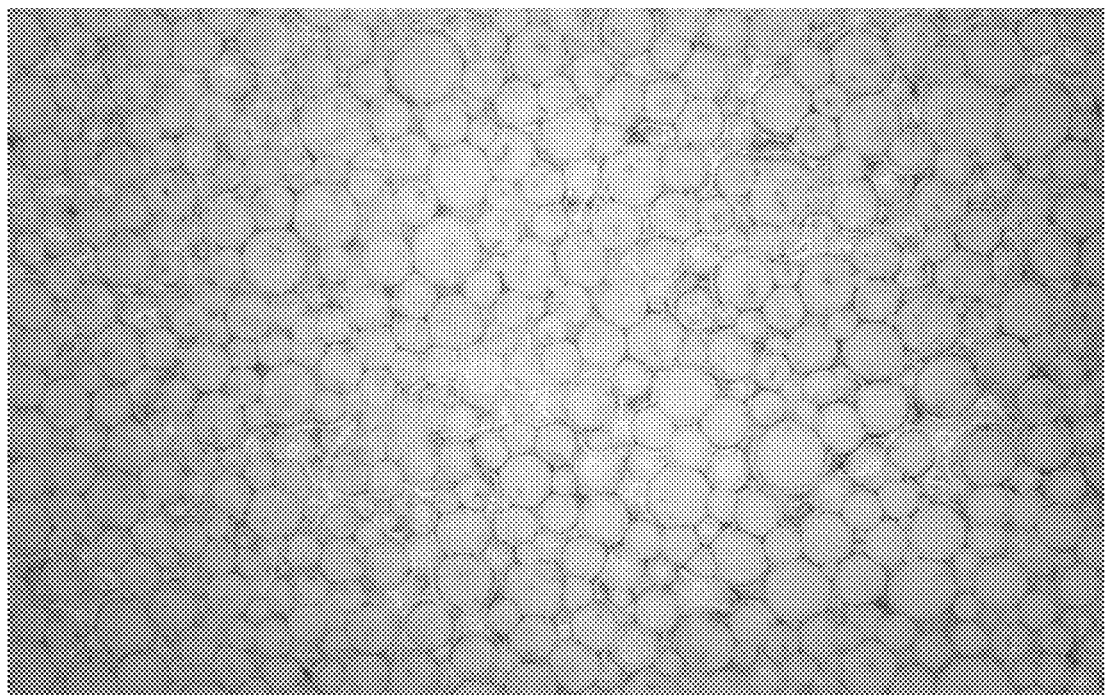
FIG. 3 is a schematic diagram showing the intact state of the magnetic microcapsules of the present invention under a writing force of 600 g.
Figure 4:
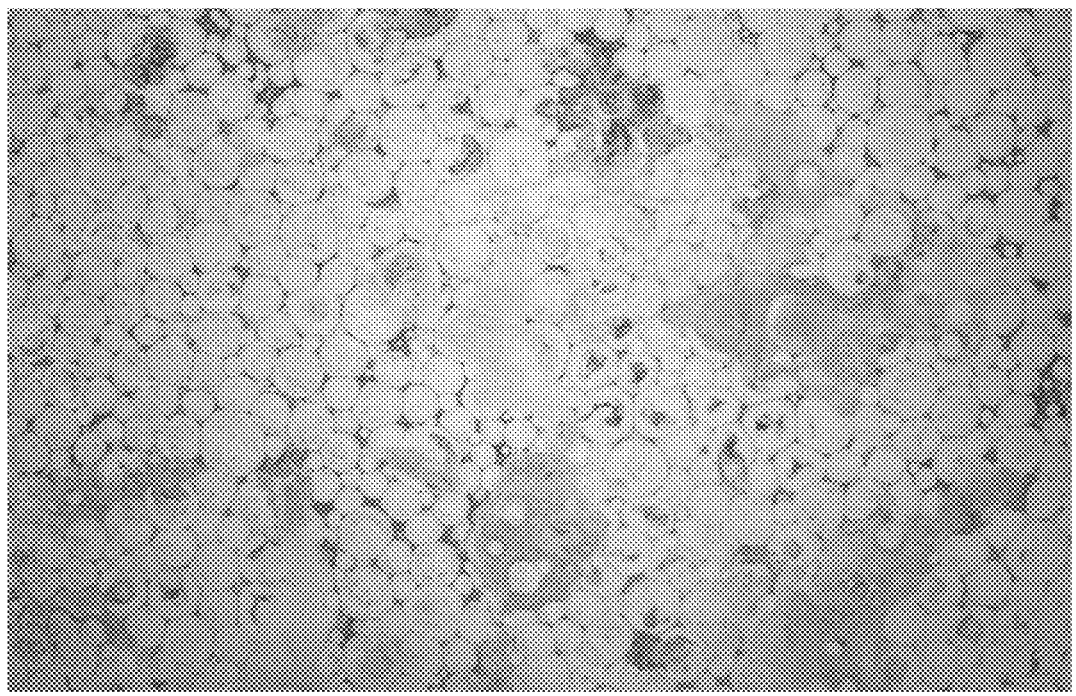
FIG. 4 is a schematic diagram showing the wall rupture of magnetic microcapsules in the prior art under a writing force of 600 g.

As shown in FIG. 3, the magnetic microcapsules in the embodiment of the present invention remain intact without any damage under a writing strength of 600 g. In contrast, as shown in FIG. 4, other existing magnetic microcapsules suffer from significant damage under the same writing strength.

Figure 5:
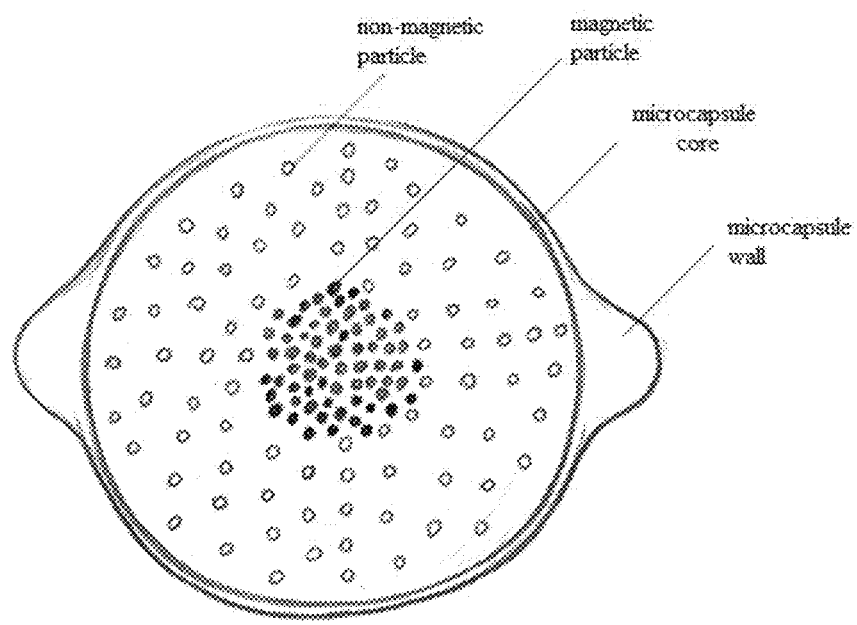
FIG. 5 is a structural schematic diagram of the magnetic microcapsules according to an embodiment of the present invention.

As shown in FIG. 5, the structural schematic diagram of the magnetic microcapsules in the embodiment of the present invention is presented. The core of the magnetic microcapsule is encapsulated by the wall material, where the core includes magnetic particles (black particles in FIG. 5) and non-magnetic particles (white particles in FIG. 5). In this embodiment, the magnetic particles include nano-magnetite ($Fe_3O_4$) used to achieve writing blackness, and oleophilic nano-ferrites used to achieve magnetization (also referred to as "writing magnetization"), which characterizes the response time or speed of the magnetic particles under the influence of an external magnetic field. A faster response or speed of magnetization means a faster erasure speed in the magnetic film. By adjusting the ratio of nano-magnetite, the writing blackness can be adjusted, while adjusting the ratio of oleophilic nano-ferrites can control the writing magnetization. The non-magnetic particles are oleophilic nano-titanium dioxide, and adjusting their ratio can adjust the whiteness of the magnetic film.

Figure 6:
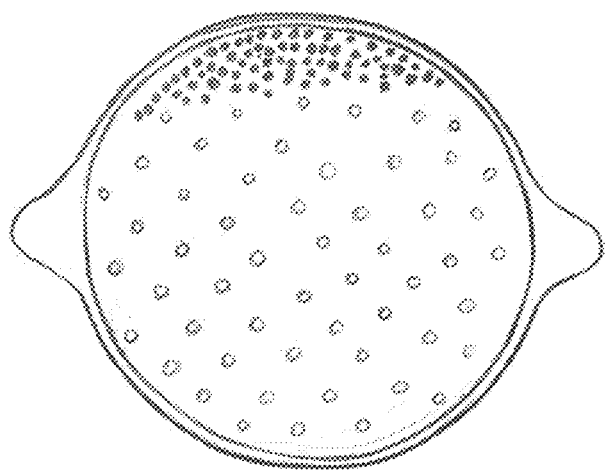
FIG. 6 is a schematic diagram showing the handwriting marks produced by the magnetic microcapsules of the present invention.
Figure 7:
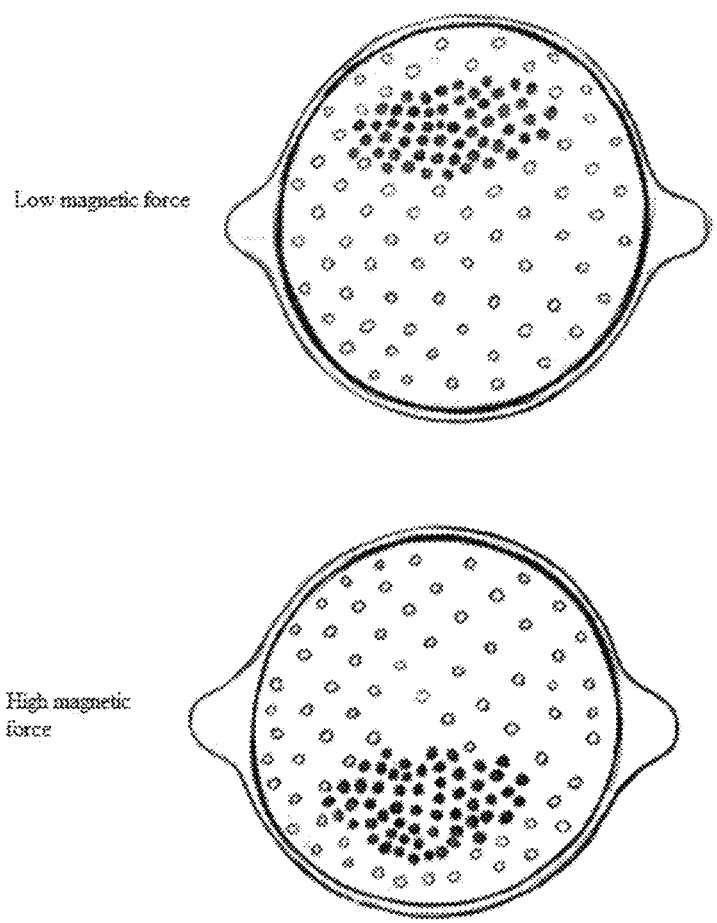
FIG. 7 is a schematic diagram showing the removal of handwriting marks by adjusting the magnetic force according to an embodiment of the present invention.

As shown in FIG. 5, in the unwritten state, the black magnetic particles are encapsulated by the white nano-titanium dioxide at the center, and the magnetic film or writing board appears white. When writing with a writing pen, as shown in FIG. 6, the magnetic particles in the microcapsules are gathered to the top of the sphere under the magnetic force of the pen, thus displaying black writing. When erasing with an erasing pen, as shown in FIG. 7, the magnetic particles move or disperse downward within the sphere under the external magnetic field. Generally, the higher the external magnetic force, the greater the dispersion of the magnetic particles, resulting in better erasure effect. The lower the magnetic force, the smaller the dispersion of the magnetic particles, leading to poorer erasure.

When the external magnetic force is constant, a higher magnetization (better magnetization) results in greater dispersion of the magnetic particles, improving the erasure effect. On the other hand, lower magnetization leads to smaller dispersion, leaving writing traces on the surface of the board and poor erasure. In this embodiment, the writing magnetization of the magnetic microcapsules can be adjusted by modifying the ratio of oleophilic nano-ferrites. A better magnetization allows the magnetic particles to be more easily dispersed under the magnetic force of the erasing pen. By adjusting the magnetic force intensity and frequency of the erasing pen, clean and rapid removal of the writing content can be achieved.

Figure 8:
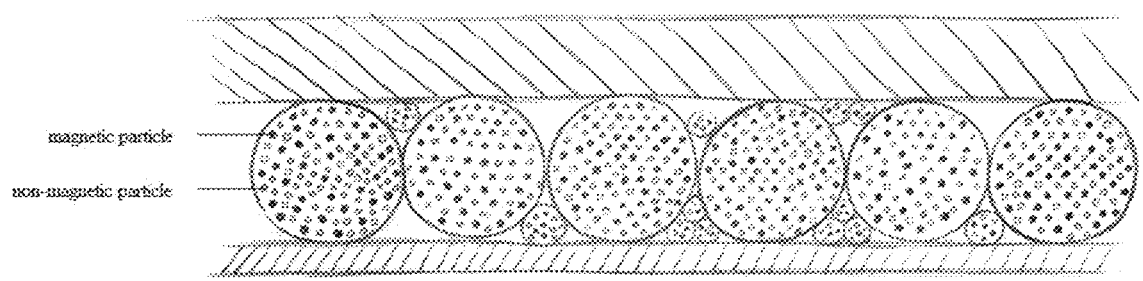
FIG. 8 is a schematic diagram showing the uniform dispersion of magnetic and non-magnetic particles in the core of the magnetic microcapsules of the present invention.

In the embodiment of the present invention, by adding a suspension stabilizer in the core material, the magnetic particles and non-magnetic particles are stably and uniformly dispersed in the system, achieving excellent anti-settling effects and enhancing the performance and lifespan of the writing board. As shown in FIG. 8, after the formation of the magnetic microcapsule film, the magnetic particles and non-magnetic particles are evenly distributed, demonstrating good anti-settling properties.

In one example, a magnetic film prepared using the magnetic microcapsules provided in the present embodiment was placed in a 50° C. high-temperature environment (where each week of baking corresponds to approximately six months of settling, and two weeks correspond to one year of settling). After baking for two weeks, the magnetic film was still capable of normal writing and erasing, indicating that the magnetic film can resist one year of settling.

Furthermore, test results show that the magnetic film has a blackness value of 0.69 and a whiteness value of 0.2 (compared to other existing magnetic films, which typically have blackness values of around 0.4-0.5). In writing or display applications, a magnetic film with high blackness provides clearer and more contrasted writing effects, which is especially important for electronic paper, erasable whiteboards, and similar devices.

In a second aspect, an embodiment of the present disclosure provides a preparation method of magnetic microcapsule, comprising:

adding magnetic particles and non-magnetic particles into an oily solvent at a predetermined mass ratio to obtain an oil-phase mixture, adding a suspension stabilizer to the oil-phase mixture and dispersing the mixture at a predetermined dispersion speed to obtain a core material suspension.

adding a cationic polymer and an anionic polymer into deionized water at a predetermined mass ratio to obtain an aqueous solution, adding the core material suspension into the aqueous solution, and stirring the mixture to disperse the core material suspension, thereby obtaining a dispersion, adding an acid-base regulator to the dispersion to adjust the pH to a predetermined value, reacting for a first predetermined time, then adding a curing agent, and continuing the reaction for a second predetermined time to obtain magnetic microcapsules.

Preferably, the cationic polymer includes one or both of gelatin and ε-polylysine, and the anionic polymer includes one or more of sodium carboxymethyl cellulose, arabic gum, and sodium alginate. The magnetic particles include nano-ferric oxide with different magnetic strengths, and also include one or both of oil-loving nano-ferrite and nano-neodymium iron boride. The non-magnetic particles are oil-loving nano-titanium dioxide.

Preferably, the oily solvent includes one or more of white oil, glyceryl trioctanoate, paraffin, dioctyl terephthalate, turpentine, transformer oil, and poly-α-olefin synthetic oil.

Preferably, the suspension stabilizer includes one or more of phthalic acid esters, polyamide wax, polysiloxane, oleic acid sorbitan, sorbitan monostearate, silica, magnesium aluminum silicate, and magnesium lithium silicate.

In one embodiment, in the preparation method of the magnetic microcapsules, the step of adding magnetic particles and non-magnetic particles into an oily solvent at a predetermined mass ratio to obtain an oil-phase mixture comprises:

Adding nano-ferrite, nano-magnetite, and nano-titanium dioxide in a mass ratio of 1:1.5 to 3:9 into the oily solvent to obtain the oil phase mixture, wherein the oily solvent includes a mass ratio of 1:7 to 9 of white oil and paraffin.

Specifically, adjusting the ratio of nano-magnetite can adjust the writing blackness, adjusting the ratio of nano-ferrite can adjust the magnetic fluidity, and adjusting the ratio of nano-titanium dioxide can adjust the whiteness. The combination of nano-ferrite, nano-magnetite, and nano-titanium dioxide in a mass ratio of 1:1.5 to 3:9 can achieve excellent blackness, whiteness, and fluidity. The low viscosity and chemical stability of white oil, combined with the high melting point and film-forming properties of paraffin, form a stable oil phase mixture in a mass ratio of 1:7 to 9, ensuring the uniform dispersion and long-term stability of magnetic and non-magnetic particles.

Preferably, the step of adding a suspension stabilizer to the oil-phase mixture and dispersing the mixture at a predetermined dispersion speed to obtain a core material suspension comprises:

adding 0.1-2 wt % of suspending stabilizer to the oil phase mixture, dispersing in a high-speed disperser for 60-90 minutes at 25° C. to obtain the core material suspension;

Specifically, the 0.1-2 wt % suspending stabilizer, such as polyamide wax and oleic acid sorbitan, provides dispersion and stability, ensuring uniform distribution of particles in the oil phase and preventing sedimentation. The 25° C. dispersion conditions maintain the fluidity of the system, and the 60-90 minutes of dispersion time ensure thorough mixing.

The step of adding a cationic polymer and an anionic polymer into deionized water at a predetermined mass ratio to obtain an aqueous solution includes:

adding gelatin and arabic gum to deionized water at a mass ratio of 1:0.8-1.2 to obtain the aqueous solution;

Specifically, gelatin and arabic gum, as cationic and anionic polymers, can form a stable wall material structure. The ratio of 1:0.8-1.2 ensures that the formed microcapsule shell has appropriate strength and flexibility.

The step of adding the core suspension to the aqueous solution and dispersing it by stirring to obtain the dispersion includes:

adding the core suspension to the aqueous solution at a ratio of 1:7-10 and stirring at a speed of 200-800 rpm using a stirring paddle to obtain the dispersion;

Specifically, by adding the core suspension to the aqueous solution at a ratio of 1:7-10 and stirring at a speed of 200-800 rpm, it ensures uniform distribution of the core in the aqueous phase and prevents aggregation.

The step of adding an acid-base regulator to the dispersion to adjust the pH to a predetermined value, reacting for a first predetermined time, then adding a curing agent, and continuing the reaction for a second predetermined time to obtain magnetic microcapsules includes:

Adding glacial acetic acid as an acid-base regulator to the dispersion, adjusting the pH to 4.4-4.5, reacting for 0.5-1 hour, and then adding glutaraldehyde as a crosslinking agent. The reaction continues for 0.5-1 hour to obtain the magnetic microcapsules.

Specifically, the pH adjustment range of 4.4-4.5 with glacial acetic acid ensures the stable reaction of the cationic and anionic polymers, forming a uniform microcapsule wall. Glutaraldehyde, as a crosslinking agent, enhances the strength and stability of the wall material, preventing breakage during writing. The 0.5-1 hour reaction time ensures sufficient crosslinking.

The step of adding an acid-base regulator to the dispersion to adjust the pH to a predetermined value, reacting for a first predetermined time, then adding a curing agent, and continuing the reaction for a second predetermined time to obtain magnetic microcapsules comprises:

Adding glacial acetic acid as an acid-base regulator to the dispersion, adjusting the pH to 4.4-4.5, reacting for 0.5-1 hour, and then adding glutaraldehyde as a crosslinking agent, continuing to for 0.5-1 hour to obtain the magnetic microcapsules.

Specifically, the pH adjustment range of 4.4-4.5 with glacial acetic acid ensures the stable reaction of the cationic and anionic polymers, forming a uniform microcapsule wall. Glutaraldehyde, as a crosslinking agent, enhances the strength and stability of the wall material, preventing breakage during writing. The 0.5-1 hour reaction time ensures sufficient crosslinking.

In one embodiment, the step of adding 0.1-2 wt % of suspending stabilizer to the oil phase mixture, dispersing in a high-speed disperser for 60-90 minutes at 25° C. to obtain the core material suspension comprises:

First, adding a mixture of 0.5-0.8 wt % of polyamide wax and sorbitan oleate to the oil-phase mixture, dispersing the mixture in a high-speed disperser at a speed of 1800-2000 rpm for 20-30 minutes under 25° C. conditions;

Next, adding 0.4-0.8 wt % of a mixture of phthalate ester and polysiloxane and continuing the dispersion at a speed of 1200-1500 rpm for 20-30 minutes under 25° C. conditions;

Finally, adding 0.1-0.4 wt % of silica and dispersing at a speed of 1000-1200 rpm for 20-30 minutes under 25° C. conditions to obtain the core material suspension.

In the preparation of the core material suspension, the process is divided into three stages. In the first stage, a mixture of polyamide wax and sorbitan oleate is added. Polyamide wax has excellent dispersibility and stability, forming a cross-linked network structure in the oil phase, which enhances the dispersion of particles and prevents settling and aggregation. Sorbitan oleate is an excellent emulsifier and stabilizer, capable of forming a stable adsorption layer on the surface of the particles, further improving the dispersion and stability of the particles. Initially, polyamide wax and sorbitan oleate are uniformly distributed in the oil phase through efficient dispersion, forming a stable dispersion system that lays the foundation for the subsequent addition of stabilizers.

In the second stage, a mixture of phthalate ester and polysiloxane is added. Phthalate ester has good wettability and dispersibility, effectively reducing the viscosity of the system and enhancing the flowability of the oil phase, further improving particle dispersion. Polysiloxane has excellent emulsifying and stabilizing properties, forming a stable adsorption layer on the surface of the particles, preventing secondary aggregation. In this stage, the dispersion speed is appropriately reduced, allowing phthalate ester and polysiloxane to mix more thoroughly with the oil phase, forming a more stable dispersion system that improves both flowability and stability.

Finally, silica is added. Silica has good adsorption and stabilizing effects and can form a stable electrostatic adsorption layer on the surface of the particles, further improving the dispersion and anti-settling properties. In this stage, the dispersion speed is reduced to allow silica to be more evenly distributed in the system, further enhancing the dispersion and anti-settling properties of the particles, ensuring the long-term stability of the microcapsules.

By adding different types of suspension stabilizers in stages, each step allows the specific stabilizer to fully exert its effect, progressively enhancing the dispersion of particles. The combination of multiple suspension stabilizers forms multiple protective layers, ensuring the long-term stability of particles in the system and preventing settling and aggregation. The use of stabilizers such as silica and polyamide wax creates a strong anti-settling effect, ensuring the stability of microcapsules during long-term storage and use. The addition of phthalate ester and polysiloxane improves the flowability of the system, reduces viscosity, and facilitates subsequent stirring and dispersion operations. Through these staged addition steps, the dispersion, stability, and anti-settling properties of the magnetic microcapsules are significantly enhanced, thereby improving the overall quality and application performance of the microcapsules.

In an embodiment, the magnetic particles include nano-ferric oxide with different magnetic strengths, and also include one or both of oil-loving nano-ferrite and nano-neodymium iron boride. The non-magnetic particles are oil-loving nano-titanium dioxide.

The step of adding magnetic particles and non-magnetic particles into an oily solvent at a predetermined mass ratio to obtain an oil-phase mixture comprises:
　　dissolving the polyurethane precursor in a preset solvent to obtain a polyurethane solution, wherein the polyurethane precursor comprises one of aromatic polyurethane, aliphatic polyurethane, or water-based polyurethane. The preset solvent includes dimethyl sulfoxide (DMSO) or ethanol.

Specifically, the polyurethane precursor serves as the foundational material for forming polyurethane and can be mixed with the solvent to form a solution. Aromatic polyurethane offers high strength and wear resistance, aliphatic polyurethane provides good flexibility and transparency, and water-based polyurethane is environmentally friendly and safe. Both DMSO and ethanol are common organic solvents that can effectively dissolve the polyurethane precursor, forming a uniform polyurethane solution.

Washing and drying the magnetic and non-magnetic particles with ethanol:
　　Specifically, ethanol is an effective cleaning agent that can remove impurities and contaminants from the surface of magnetic and non-magnetic particles, ensuring their surfaces are clean. After cleaning, the particles are dried to remove any residual ethanol, which could interfere with the subsequent steps. The dried particles are more conducive to the coating reaction with the polyurethane precursor in the solution.

Adding the cleaned and dried magnetic and non-magnetic particles to the polyurethane solution to obtain a mixed solution;
　　Specifically, after cleaning and drying the particles, they are added separately to the polyurethane solution, ensuring that each type of particle is uniformly dispersed in the solution. This step ensures that the polyurethane precursor can fully contact the surface of the particles, preparing them for the subsequent coating reaction.

Stirring the mixed solution at a preset reaction time and temperature to allow the polyurethane to coat the magnetic and non-magnetic particles;
　　The mixed solution is stirred under preset conditions, with the polyurethane coating the surface of the magnetic and non-magnetic particles. The preset reaction time is between 1 to 4 hours, and the preset reaction temperature is between 60 to 80° C. Stirring the solution at the prescribed temperature and time allows the polyurethane precursor to react and cure, forming a uniform coating layer. The temperature and time control is critical, as the range of 60 to 80° C. promotes the reaction and curing of the polyurethane precursor, ensuring the formation of a uniform and stable coating layer.

Adding the coated magnetic and non-magnetic particles to the oil solvent according to the predetermined mass ratio to obtain the oil phase mixture;
　　Finally, the coated particles are added to the oil solvent in the predetermined mass ratio, forming the final oil phase mixture. Due to the polyurethane coating on the particles' surfaces, their dispersion and stability in the oil solvent are significantly improved, preventing aggregation between the particles and ensuring the uniformity and long-term stability of the oil phase mixture.

In a third aspect, an embodiment of the present disclosure provides a magnetic film, wherein the magnetic film comprises: a PET substrate layer, a rubber-based adhesive layer positioned above the PET substrate layer, a mixture layer of water-based adhesive and microcapsules positioned above the rubber-based adhesive layer; and, an AG PET film layer positioned above the mixture layer of water-based adhesive and magnetic microcapsules, wherein the magnetic microcapsules are either the magnetic microcapsules described in any embodiment of the first aspect of the magnetic microcapsules prepared by the preparation method described in the second aspect.

Preferably, the thickness of the AG PET film is between 0.1 mm and 0.14 mm, with a haze value ranging from 28% to 29%, and a hardness of 4H.

Preferably, the aqueous adhesive includes any one or more of PVA aqueous solution, polyurethane, UV absorbers, or leveling agents.

The magnetic film can be used in various fields such as education, office, commercial, and retail industries, for example, for displaying course content in teaching; for explaining, discussing, and recording important information during training sessions and meetings; for students to take notes, practice writing, and review at home using a portable writing board; and for displaying daily specials, menus, and promotional information in restaurants, cafes, and retail stores, etc.

The following detailed embodiments and comparative examples provide further explanation. The raw materials used in the specific embodiments and comparative examples, unless otherwise stated, can be commercially available. The instruments used, unless otherwise stated, can also be commercially available, and the processes involved, unless otherwise stated, are conventional selections within the technical field.

Example 1

1. Preparation of Magnetic Microcapsules 1.1. Add 1 g of nano-ferrite with an average particle size of 400 nm to 800 nm, 1.5 g of nano-magnetite with an average particle size of 200 nm to 500 nm, and 9 g of titanium dioxide with an average particle size of 200 nm to 500 nm, in a mass ratio of 1:1.5:9, to an oil phase mixture comprising 1 g of white oil and 7 g of paraffin (in a mass ratio of 1:7) to obtain an oil phase mixture.

1.2. After adding 0.1 wt % of a suspension stabilizer to the oil phase mixture, disperse the oil phase mixture in a high-speed disperser at 25° C. for 60 minutes to obtain a core suspension.

1.3. Add 1 g of gelatin and 1 g of sodium carboxymethyl cellulose to 100 g of deionized water to obtain an aqueous solution.

1.4. Add the aforementioned core suspension to the aqueous solution in a mass ratio of 1:7, and use a stirrer to disperse the mixture at a speed of 500 rpm to obtain a dispersion.

1.5. Add acetic acid (ice acetic acid) as a pH regulator to the dispersion to adjust the pH to 4.5. After 0.5 hours of reaction, add 1 g of glutaraldehyde as a curing agent, and continue the reaction for another 0.5 hours to obtain the magnetic microcapsules.

2. Preparation of Magnetic Film 2.1. Mix the magnetic microcapsules and the aqueous binder in a mass ratio of 6:4. Stir the mixture at a speed of 1500 rpm for 2 hours to obtain the aqueous binder and magnetic microcapsule mixture.

2.2. Apply the obtained mixture to the surface of an AG PET film with a thickness of 0.12 mm using a coating machine. The coating thickness is 0.35 mm. Then, dry the coated AG PET film at 100° C. for 2 hours to form a microcapsule coating on the AG PET film. Next, sequentially laminate a rubber-based pressure-sensitive adhesive and a PET substrate on the side of the microcapsule coating away from the AG PET film to obtain the magnetic film.

Optionally, after forming the microcapsule coating on the AG PET film, the coated AG PET film can undergo screen printing using a screen mesh of 30 mesh. The film is then cut to the required size for producing a writing board, followed by lamination of a rubber-based pressure-sensitive adhesive and a PET substrate to obtain the magnetic film.

Figure 9A:
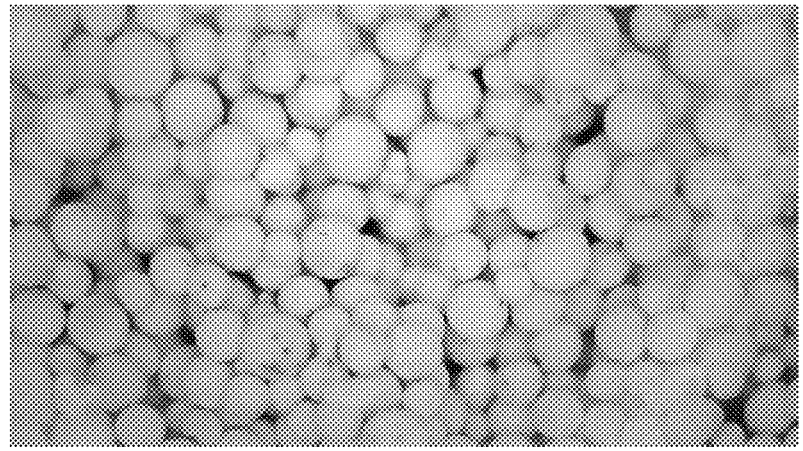
FIG. 9a is a schematic diagram of the magnetic microcapsules in embodiment 1 of the present invention.
Figure 9B:
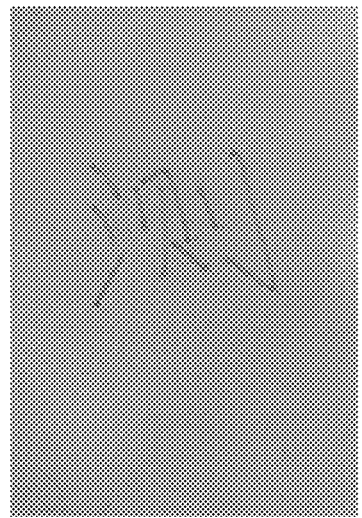
FIG. 9b is a schematic diagram of the magnetic film in Example 1 of the present invention.

In this embodiment, as shown in FIG. 9a, a schematic image of the magnetic microcapsules prepared in this embodiment is shown under a microscope. FIG. 9b shows the schematic comparison of the writing contrast effect of the magnetic film made using these magnetic microcapsules. As shown in FIG. 9a, the magnetic microcapsules have a high conglomeration rate, and their shape and size are relatively uniform. Most of the magnetic microcapsules are well-dispersed without aggregation, but a small portion of the microcapsules are aggregated together (as shown in the lower-right corner of the image), and the viscosity is moderate. As shown in FIG. 9b, the magnetic film has a moderate blackness, and the writing contrast of the magnetic film is also at a moderate level. Due to the higher proportion of magnetic particles in the nano-ferrite, the film has optimized flowability. The test results for erasing the writing with an eraser pen show a high average erasure speed.

Example 2

1. Preparation of Magnetic Microcapsules

Add 1 g of nano-ferrite with an average particle size of 400 nm to 800 nm, 2 g of nano-magnetite with an average particle size of 200 nm to 500 nm, and 9 g of titanium dioxide with an average particle size of 200 nm to 500 nm into 1 g of white oil and 7 g of paraffin in a mass ratio of 1:7 to obtain an oil phase mixture.

Add 1 wt % of a suspending stabilizer to the oil phase mixture, then disperse the mixture in a high-speed disperser at 25° C. for 60 minutes to obtain a core suspension.

Add 1 g of gelatin and 1 g of arabic gum to 100 g of deionized water to obtain an aqueous solution.

Add the core suspension to the aqueous solution at a mass ratio of 1:7.5, and use a stirring paddle to disperse the mixture at a speed of 450 rpm to obtain the dispersion.

Add acetic acid as a pH adjuster to the dispersion to adjust the pH to 4.5. After reacting for 1 hour, add 1 g of glutaraldehyde as a crosslinking agent and continue reacting for another 0.5 hours to obtain the magnetic microcapsules.

2. Preparation of Magnetic Film

Mix the magnetic microcapsules and the aqueous binder in a mass ratio of 6:4. Stir the mixture at 1500 rpm for 2 hours to obtain a mixture of the aqueous binder and magnetic microcapsules.

Apply the mixture to the surface of an AG PET film with a thickness of 0.12 mm using a coating machine. The coating thickness is 0.35 mm. Then, dry the coated AG PET film at 100° C. for 2 hours to form a microcapsule coating on the AG PET film. Afterward, sequentially laminate a rubber-based pressure-sensitive adhesive and a PET substrate on the side of the microcapsule coating away from the AG PET film to obtain the magnetic film.

Figure 10A:
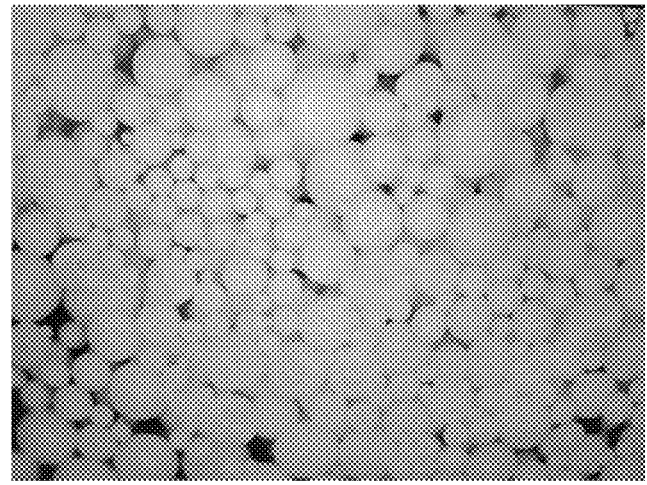
FIG. 10a is a schematic diagram of the magnetic microcapsules in Example 2 of the present invention.
Figure 10B:
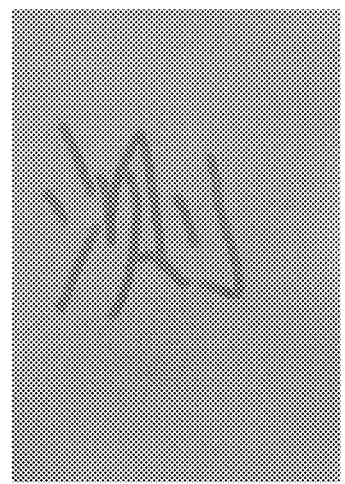
FIG. 10b is a schematic diagram of the magnetic film in Example 2 of the present invention.

In this example, the magnetic microcapsules have a high conglomeration rate, low viscosity, high average erasure speed, and high writing contrast. As shown in FIG. 10a, the magnetic microcapsules have a high conglomeration rate, and the size of the microcapsules is uneven. The large and small particle size magnetic microcapsules each account for about half of the total. However, the microcapsules are well-dispersed without aggregation, and the overall viscosity is low. Since the proportion of nano-magnetite is increased in this example compared to Example 1, the increased number of magnetic particles enhances the blackness, improving the contrast. As shown in FIG. 10b, the magnetic film has a higher blackness and writing contrast than the magnetic film in FIG. 9b.

Example 3

1. Preparation of Magnetic Microcapsules

Add 1 g of nano-ferrite with an average particle size of 400 nm to 800 nm, 2 g of nano-magnetite with an average particle size of 200 nm to 500 nm, and 9 g of titanium dioxide with an average particle size of 200 nm to 500 nm into 1 g of white oil and 9 g of paraffin in a mass ratio of 1:9 to obtain an oil phase mixture.

Add 2 wt % of a suspending stabilizer to the oil phase mixture, then disperse the mixture in a high-speed disperser at 25° C. for 60 minutes to obtain the core suspension.

Add 1 g of gelatin and 1 g of arabic gum to 100 g of deionized water to obtain an aqueous solution.

Add the core suspension to the aqueous solution at a mass ratio of 1:10, and use a stirring paddle to disperse the mixture at a speed of 450 rpm to obtain the dispersion.

Add acetic acid as a pH adjuster to the dispersion to adjust the pH to 4.5. After reacting for 1 hour, add 1 g of glutaraldehyde as a crosslinking agent and continue reacting for another 0.5 hours to obtain the magnetic microcapsules.

2. Preparation of Magnetic Film

Mix the magnetic microcapsules and the aqueous binder in a mass ratio of 6:4. Stir the mixture at 1500 rpm for 2 hours to obtain a mixture of the aqueous binder and magnetic microcapsules.

Apply the mixture to the surface of an AG PET film with a thickness of 0.12 mm using a coating machine. The coating thickness is 0.35 mm. Then, dry the coated AG PET film at 100° C. for 2 hours to form a microcapsule coating on the AG PET film. Afterward, sequentially laminate a rubber-based pressure-sensitive adhesive and a PET substrate on the side of the microcapsule coating away from the AG PET film to obtain the magnetic film.

Figure 11A:
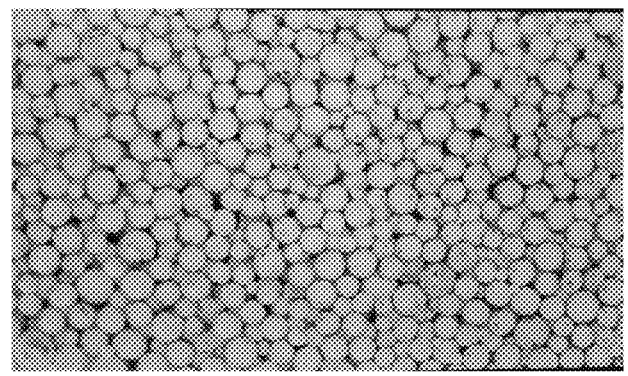
FIG. 11a is a schematic diagram of the magnetic microcapsules in Example 3 of the present invention.
Figure 11B:
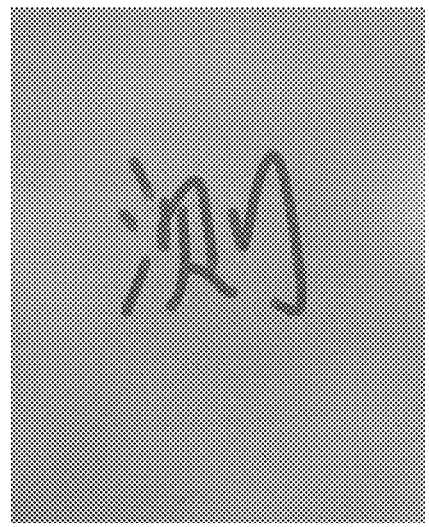
FIG. 11b is a schematic diagram of the magnetic film in Example 3 of the present invention.

In this example, as shown in FIG. 11a, the magnetic microcapsules have a high conglomeration rate, a relatively uniform size, and do not aggregate, with a low overall viscosity. Additionally, in this example, the proportion of nano-magnetite is higher than in Example 1, which increases the blackness. As shown in FIG. 11b, the magnetic film has significantly higher blackness compared to the magnetic film in FIG. 9b, and the writing contrast of the magnetic film is also higher than that of the magnetic film in FIG. 9b.

Example 4

1. Preparation of Magnetic Microcapsules

Add 1 g of nano-ferrite with an average particle size of 400 nm to 800 nm, 3 g of nano-magnetite with an average particle size of 200 nm to 500 nm, and 9 g of titanium dioxide with an average particle size of 200 nm to 500 nm into 1 g of white oil and 9 g of paraffin in a mass ratio of 1:9 to obtain an oil phase mixture.

Add 2 wt % of a suspending stabilizer to the oil phase mixture, then disperse the mixture in a high-speed disperser at 25° C. for 60 minutes to obtain the core suspension.

Add 1 g of poly-L-lysine and 1 g of arabic gum to 100 g of deionized water to obtain an aqueous solution.

Add the core suspension to the aqueous solution at a mass ratio of 1:10, and use a stirring paddle to disperse the mixture at a speed of 450 rpm to obtain the dispersion.

Add acetic acid as a pH adjuster to the dispersion to adjust the pH to 4.5. After reacting for 1 hour, add 1 g of glutaraldehyde as a crosslinking agent and continue reacting for another 0.5 hours to obtain the magnetic microcapsules.

2. Preparation of Magnetic Film

Mix the magnetic microcapsules and the aqueous binder in a mass ratio of 6:4. Stir the mixture at 1500 rpm for 2 hours to obtain a mixture of the aqueous binder and magnetic microcapsules.

Apply the mixture to the surface of an AG PET film with a thickness of 0.12 mm using a coating machine. The coating thickness is 0.35 mm. Then, dry the coated AG PET film at 100° C. for 2 hours to form a microcapsule coating on the AG PET film. Afterward, sequentially laminate a rubber-based pressure-sensitive adhesive and a PET substrate on the side of the microcapsule coating away from the AG PET film to obtain the magnetic film.

Figure 12A:
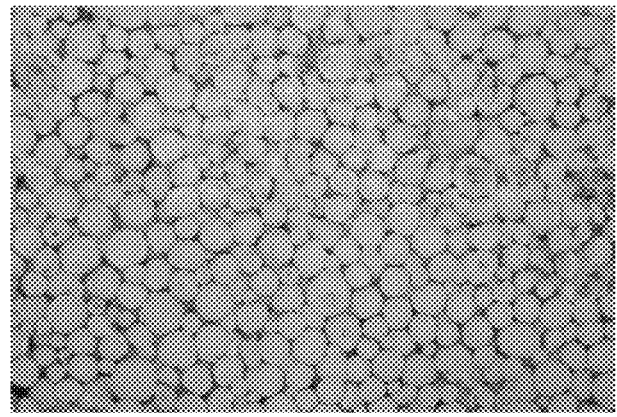
FIG. 12a is a schematic diagram of the magnetic microcapsules in Example 4 of the present invention.
Figure 12B:
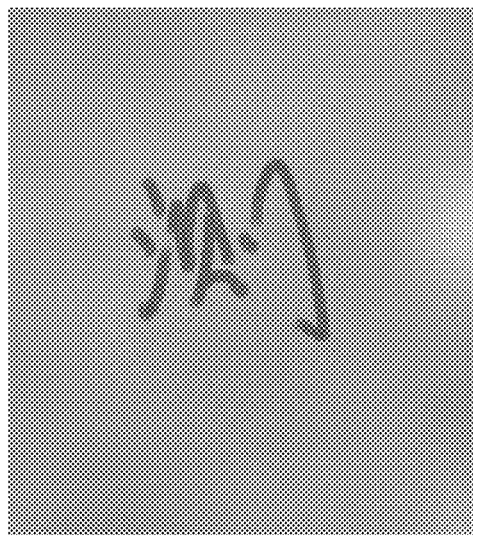
FIG. 12b is a schematic diagram of the magnetic film in Example 4 of the present invention.

In this example, as shown in FIG. 12a, the magnetic microcapsules have a high conglomeration rate, a relatively uniform size, but a small portion of the magnetic microcapsules aggregate and stick together, resulting in moderate viscosity. The viscosity may slightly affect the average erasure speed of the magnetic film. While this example increases the proportion of nano-magnetite to improve the blackness and contrast of the magnetic film, the proportion of nano-ferrite in the magnetic particles has decreased compared to Examples 1-3, leading to a reduction in magnetic flowability. Consequently, the average erasure speed is moderate, which is slightly inadequate.

Example 5

1. Preparation of Magnetic Microcapsules

Add 1 g of nano-ferrite with an average particle size of 400 nm to 800 nm, 3 g of nano-magnetite with an average particle size of 200 nm to 500 nm, and 9 g of titanium dioxide with an average particle size of 200 nm to 500 nm into 1 g of white oil and 8 g of paraffin in a mass ratio of 1:8 to obtain an oil phase mixture.

Add 2 wt % of a suspending stabilizer to the oil phase mixture, then disperse the mixture in a high-speed disperser at 25° C. for 60 minutes to obtain the core suspension.

Add 1 g of poly-L-lysine and 1 g of arabic gum to 100 g of deionized water to obtain an aqueous solution.

Add the core suspension to the aqueous solution at a mass ratio of 1:10, and use a stirring paddle to disperse the mixture at a speed of 500 rpm to obtain the dispersion.

Add acetic acid as a pH adjuster to the dispersion to adjust the pH to 4.5. After reacting for 1 hour, add 0.5 g of glutaraldehyde as a crosslinking agent and continue reacting for another 1 hour to obtain the magnetic microcapsules.

2. Preparation of Magnetic Film

Mix the magnetic microcapsules and the aqueous binder in a mass ratio of 6:4. Stir the mixture at 1500 rpm for 2 hours to obtain a mixture of the aqueous binder and magnetic microcapsules.

Apply the mixture to the surface of an AG PET film with a thickness of 0.12 mm using a coating machine. The coating thickness is 0.35 mm. Then, dry the coated AG PET film at 100° C. for 2 hours to form a microcapsule coating on the AG PET film. Afterward, sequentially laminate a rubber-based pressure-sensitive adhesive and a PET substrate on the side of the microcapsule coating away from the AG PET film to obtain the magnetic film.

Figure 13A:
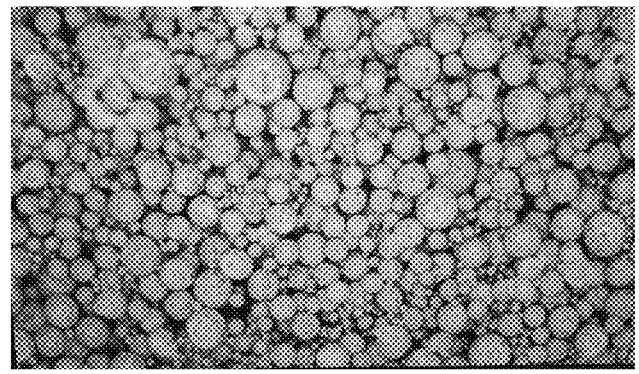
FIG. 13a is a schematic diagram of the magnetic microcapsules in Example 5 of the present invention.
Figure 13B:
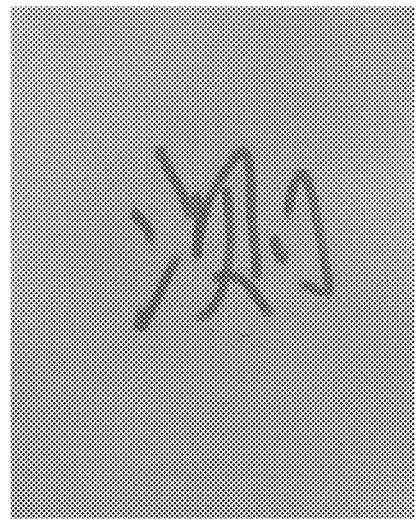
FIG. 13b is a schematic diagram of the magnetic film in Example 5 of the present invention.

In this example, as shown in FIG. 13a, the magnetic microcapsules have a high conglomeration rate, but their sizes are uneven, including small, medium, and large particle sizes. The small particles tend to aggregate and stick to the larger particles, resulting in a moderate overall viscosity.

This viscosity may affect the average erasure speed of the magnetic film. Although this example increases the proportion of nano-magnetite to improve the blackness and contrast of the magnetic film, the proportion of nano-ferrite in the magnetic particles is lower compared to Examples 1-3, leading to a reduction in magnetic flowability. As a result, the average erasure speed is moderate, which is slightly insufficient.

Comparative Example 1

Figure 14A:
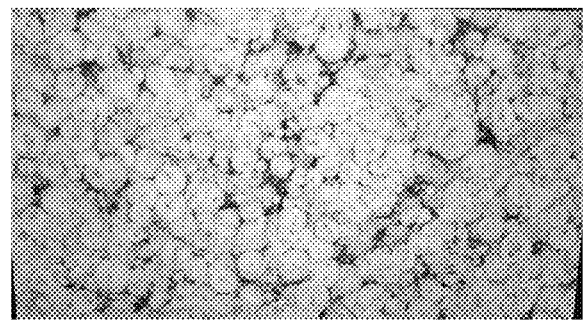
FIG. 14a is a schematic diagram of the magnetic microcapsules in Comparative Example 1 of the present invention.
Figure 14B:
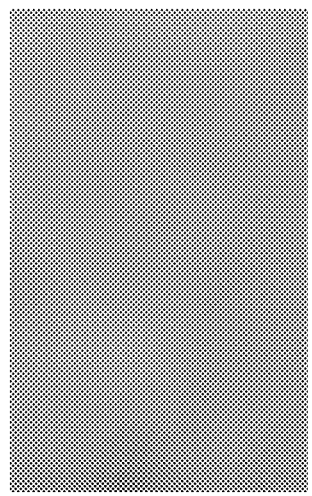
FIG. 14b is a schematic diagram of the magnetic film in Comparative Example 1 of the present invention.

Differences from Examples 1-5: In this comparative example, no nano-ferrite and white oil were added during the preparation process.
1. Preparation of Magnetic Microcapsules
Add 2 g of nano-magnetite with an average particle size of 200 nm to 500 nm and 9 g of titanium dioxide with an average particle size of 200 nm to 500 nm into 9 g of paraffin as the oil phase solvent to obtain the oil phase mixture.
Add 0.1 wt % of a suspending stabilizer to the oil phase mixture, then disperse the mixture in a high-speed disperser at 25° C. for 60 minutes to obtain the core suspension.
Add 1 g of gelatin and 1 g of arabic gum to 100 g of deionized water to obtain the aqueous solution.
Add the core suspension to the aqueous solution at a mass ratio of 1:10, and use a stirring paddle to disperse the mixture at a speed of 450 rpm to obtain the dispersion.
Add acetic acid as a pH adjuster to the dispersion to adjust the pH to 4.5. After reacting for 1 hour, add 1 g of glutaraldehyde as a crosslinking agent and continue reacting for another 0.5 hour to obtain the magnetic microcapsules.
2. Preparation of Magnetic Film
Mix the magnetic microcapsules and the aqueous binder in a mass ratio of 6:4. Stir the mixture at 1500 rpm for 2 hours to obtain a mixture of the aqueous binder and magnetic microcapsules.
Apply the mixture to the surface of an AG PET film with a thickness of 0.12 mm using a coating machine. The coating thickness is 0.35 mm. Then, dry the coated AG PET film at 100° C. for 2 hours to form a microcapsule coating on the AG PET film. Afterward, sequentially laminate a rubber-based pressure-sensitive adhesive and a PET substrate on the side of the microcapsule coating away from the AG PET film to obtain the magnetic film.
In this comparative example, the magnetic microcapsules have a high viscosity, and due to the absence of white oil and oleophilic nano-ferrite, the film formed has poor magnetic flowability, slow (low) erasure speed, and low writing contrast. As shown in FIG. 14a, the magnetic microcapsules have a high conglomeration rate, but in FIG. 14b, the magnetic film made from these microcapsules shows no magnetic flow.

Comparative Example 2

Figure 15A:
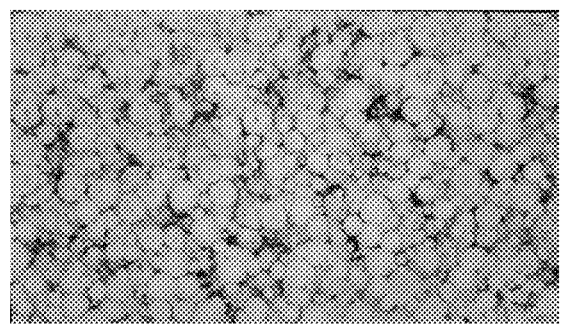
FIG. 15a is a schematic diagram of the magnetic microcapsules in Comparative Example 2 of the present invention.
Figure 15B:
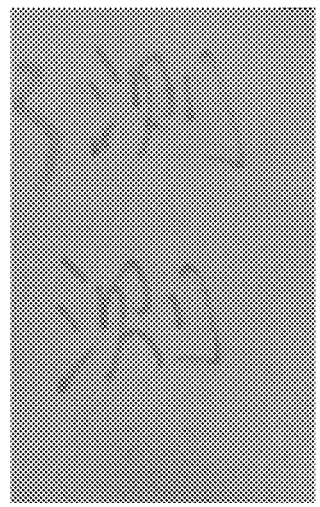
FIG. 15b is a schematic diagram of the magnetic film in Comparative Example 2 of the present invention.

Differences from Examples 1-5: In this comparative example, no nano-ferric oxide ($Fe_3O_4$) was added during the preparation process.
1. Preparation of Magnetic Microcapsules
Add 1 g of nano-ferrite with an average particle size of 400 nm to 800 nm and 9 g of titanium dioxide with an average particle size of 200 nm to 500 nm into an oil phase solvent comprising 1 g of white oil and 8 g of paraffin in a mass ratio of 1:8 to obtain the oil phase mixture.
Add 1 wt % of a suspending stabilizer to the oil phase mixture, then disperse the mixture in a high-speed disperser at 25° C. for 60 minutes to obtain the core suspension.
Add 1 g of gelatin and 1 g of arabic gum to 100 g of deionized water to obtain the aqueous solution.
Add the core suspension to the aqueous solution at a mass ratio of 1:10, and use a stirring paddle to disperse the mixture at a speed of 450 rpm to obtain the dispersion.
Add acetic acid as a pH adjuster to the dispersion to adjust the pH to 4.5. After reacting for 0.5 hour, add 1 g of glutaraldehyde as a crosslinking agent and continue reacting for another 0.5 hour to obtain the magnetic microcapsules.
2. Preparation of Magnetic Film
Mix the magnetic microcapsules and the aqueous binder in a mass ratio of 6:4. Stir the mixture at 1500 rpm for 2 hours to obtain a mixture of the aqueous binder and magnetic microcapsules.
Apply the mixture to the surface of an AG PET film with a thickness of 0.12 mm using a coating machine. The coating thickness is 0.35 mm. Then, dry the coated AG PET film at 100° C. for 2 hours to form a microcapsule coating on the AG PET film. Afterward, sequentially laminate a rubber-based pressure-sensitive adhesive and a PET substrate on the side of the microcapsule coating away from the AG PET film to obtain the magnetic film.
In this comparative example, the magnetic microcapsules have a low conglomeration rate, high viscosity, and a medium erasure speed. Due to the absence of nano-ferric oxide ($Fe_3O_4$), the writing contrast is low. As shown in FIG. 15a, the magnetic microcapsules have low conglomeration rate, and in FIG. 15b, the magnetic film made from these microcapsules shows low writing contrast.

Comparative Example 3

Figure 16:
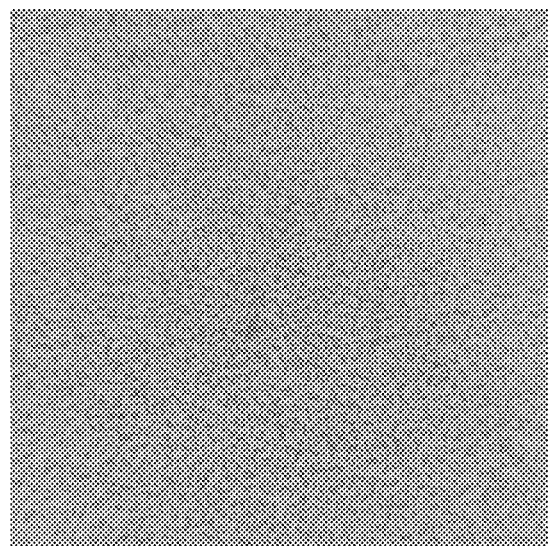
FIG. 16 is a schematic diagram of the magnetic film in Comparative Example 3 of the present invention.

Differences from Example 3: In this comparative example, the mass ratio of magnetic microcapsules to the aqueous binder is 3:7, and the stirring speed of the mixer is 3000 rpm.
1. Preparation of Magnetic Microcapsules
The preparation process for magnetic microcapsules is the same as in Example 3, and will not be repeated here.
2. Preparation of Magnetic Film
Mix the magnetic microcapsules and the aqueous binder in a mass ratio of 3:7. Stir the mixture at 3000 rpm for 2 hours to obtain the mixture of the aqueous binder and magnetic microcapsules.
Apply the mixture to the surface of an AG PET film with a thickness of 0.12 mm using a coating machine. The coating thickness is 0.35 mm. Then, dry the coated AG PET film at 100° C. for 2 hours to form a microcapsule coating on the AG PET film. Afterward, sequentially laminate a rubber-based pressure-sensitive adhesive and a PET substrate on the side of the microcapsule coating away from the AG PET film to obtain the magnetic film.
In this comparative example, the mass ratio of magnetic microcapsules and aqueous binder is not ideal, resulting in a magnetic film with noticeable particle formation, poor coating quality, and uneven distribution, as shown in FIG. 16.

Comparative Example 4

Differences from Example 3: In this comparative example, the mass ratio of magnetic microcapsules to the aqueous binder is 5:5, and the stirring speed of the mixer is 2000 rpm.
1. Preparation of Magnetic Microcapsules
1.1. The preparation process for magnetic microcapsules is the same as in Example 3, and will not be repeated here.

2. Preparation of Magnetic Film 2.1. Mix the magnetic microcapsules and the aqueous binder in a mass ratio of 5:5. Stir the mixture at 2000 rpm for 2 hours to obtain the mixture of the aqueous binder and magnetic microcapsules.

2.2. Apply the mixture to the surface of an AG PET film with a thickness of 0.12 mm using a coating machine. The coating thickness is 0.35 mm. Then, dry the coated AG PET film at 100° C. for 2 hours to form a microcapsule coating on the AG PET film. Afterward, sequentially laminate a rubber-based pressure-sensitive adhesive and a PET substrate on the side of the microcapsule coating away from the AG PET film to obtain the magnetic film.

Figure 17:
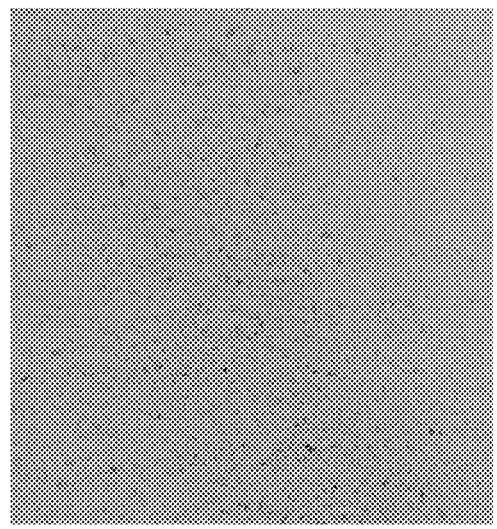
FIG. 17 is a schematic diagram of the magnetic film in Comparative Example 4 of the present invention.

In this comparative example, the mass ratio of magnetic microcapsules and aqueous binder is not ideal, resulting in a magnetic film with noticeable particle formation, poor coating quality, and uneven distribution, as shown in FIG. 17.

To sum up, a performance comparison table shown in Table 1 is obtained:

TABLE 1

Performance Comparison Table

| Magnetic Microcapsules/ Magnetic Film | Conglomeration rate | Viscosity | Erasure Speed | Contrast |
|---|---|---|---|---|
| Example 1 | Relatively high | Medium | High | Relatively high |
| Example 2 | Relatively high | Low | High | Relatively high |
| Example 3 | High | Low | High | High |
| Example 4 | High | Medium | Medium | High |
| Example 5 | High | Medium | Medium | High |
| Comparative Example 1 | Medium | Medium | Low | Low |
| Comparative Example 2 | Low | High | Medium | Low |

The evaluation levels are divided into five categories: low, relatively low, medium, relatively high, and high. A higher conglomeration rate indicates more evenly sized magnetic microcapsules. Lower viscosity and higher erasure speed indicate better magnetic film erasure performance and magnetic flowability. A higher contrast indicates better writing performance of the magnetic film.

The results show that Example 3 exhibits the best overall performance in all performance indicators: high conglomeration rate, low viscosity, high erasure speed, and high contrast. This suggests that Example 3 has significant advantages in forming uniformly sized magnetic microcapsules, easy erasure, and superior writing performance, making it ideal for applications requiring high writing quality. Examples 1, 2, 4, and 5 also demonstrate good performance, with high or relatively high conglomeration rates, low or medium viscosity, and high or relatively high removal speeds and contrast. While their performance indicators do not match Example 3, they still offer a good user experience and are suitable for general application needs. In contrast, Comparative Example 1 and Comparative Example 2 show poor overall performance. Comparative Example 1 has medium conglomeration rate and viscosity, low removal speed, and low contrast, indicating that its magnetic microcapsules are not uniform, leading to difficulties in erasure and poor writing performance. Comparative Example 2 has a low conglomeration rate, high viscosity, medium removal speed, and very low contrast, making it significantly limited in practical applications. Further improvement in material ratios and process parameters is necessary to enhance its overall performance.

In terms of material selection, magnetic materials such as nano-ferrite and nano-ferroferric oxide, non-magnetic materials such as nano-titanium dioxide, and suspending stabilizers play a key role. By properly selecting the ratios of these magnetic materials and the preparation process, the performance of the magnetic microcapsules and magnetic films can be significantly enhanced.

Embodiment 2

In Embodiment 1, the magnetic particles appear black and are incapable of achieving color display. Although this structure provides relatively clear writing effects, the lack of color diversity limits its application in fields such as education and artistic creation. In the embodiment 2, the magnetic particles are obtained through the following steps:

the magnetic particles are prepared by the following steps:
  dissolving an iron salt in water and stirring uniformly to obtain an iron salt mixed solution;
  slowly adding an alkaline substance dropwise into the iron salt mixed solution under stirring conditions to obtain a precipitate solution of ferric oxide precursor;
  adding oleic acid to the ferric oxide precursor precipitate solution, stirring until the reaction is complete, washing with a first solvent, and drying to obtain modified nano ferric oxide;
  mixing the modified nano ferric oxide, a polymer, a second solvent, and a dye to form an oil-phase solution; adding the oil-phase solution into an aqueous solution containing a dispersant, stirring to disperse, and heating to evaporate the solvent to obtain the colored magnetic particles; or mixing the modified nano ferric oxide, a monomer, a dye, and an initiator, and stirring at a preset temperature until the reaction is complete to obtain the colored magnetic particles.

Specifically, the process begins by dissolving iron salts in water and stirring to obtain a uniform iron salt mixed solution. Under stirring conditions, an alkaline substance is slowly added to control the reaction rate, forming a ferric oxide precursor precipitate solution. At this stage, precursors of ferric oxide, such as ferric hydroxide, begin to form. These precursors provide the foundation for subsequent synthesis of magnetic particles.

Next, oleic acid is added to the ferric oxide precursor precipitate solution. As a surfactant or dispersant, oleic acid plays a role in surface modification during the synthesis process. It coats the surface of ferric oxide particles, altering their surface properties, preventing particle aggregation, and promoting uniformity and stability of the magnetic particles. After stirring until the reaction is complete, the resulting product is washed with a first solvent to remove unreacted substances and impurities, followed by drying to yield modified nano ferric oxide.

Once the modified nano ferric oxide is obtained, it is mixed with a polymer, a second solvent, and a dye to form an oil-phase solution. The addition of dye imparts different colors or a range of colors to the ferric oxide particles, while the polymer aids in the stable attachment of the dye to the magnetic particles, preventing dye detachment from the particle surface. This oil-phase solution is then added to an aqueous solution containing a dispersant and stirred to disperse the magnetic particles uniformly in the aqueous solution. Heating is applied to evaporate the solvent, ultimately yielding colored magnetic particles with excellent dispersibility and stability.

In another embodiment, after obtaining the modified nano ferric oxide, it can be mixed with a monomer, a dye, and an initiator and stirred at a preset temperature to induce a polymerization reaction, resulting in the formation of colored magnetic particles. This method leverages the polymerization reaction between the monomer and initiator to further enhance the stability and functionality of the colored magnetic particles, ensuring more durable dye effects while improving properties such as heat resistance and chemical resistance.

In this invention, the combination of dye and magnetic particles enables the resulting magnetic particles to exhibit not only magnetic properties but also multiple colors, meeting the market demand for colorful displays. Furthermore, the use of oleic acid and polymers as surface modifiers effectively enhances the stability of the magnetic particles, preventing aggregation. This improves the dispersibility and uniformity of the colored magnetic particles, ensuring consistent performance in applications.

Preferably, in terms of parts by weight, the step of dissolving an iron salt in water and stirring uniformly to obtain an iron salt mixed solution comprises:

dissolving 16-20 parts of iron salt in 300-500 parts of water and stirring uniformly to obtain the iron salt mixed solution.

the step of slowly adding an alkaline substance dropwise into the iron salt mixed solution under stirring conditions to obtain a precipitate solution of ferric oxide precursor comprises:

slowly adding 100-140 parts of an alkaline substance dropwise into the iron salt mixed solution under stirring conditions while maintaining the reaction temperature at 60-80° C. and the pH at 8.5-11 to obtain the ferric oxide precursor precipitate solution.

the step of adding oleic acid to the ferric oxide precursor precipitate solution, stirring until the reaction is complete, washing with a first solvent, and drying to obtain modified nano ferric oxide comprises:

adding 1-2 parts of oleic acid to the ferric oxide precursor precipitate solution, stirring at 60-80° C. until the reaction is complete, washing 2-4 times with 250-400 parts of a first solvent, and drying to obtain the modified nano ferric oxide.

the step of adding the oil-phase solution to an aqueous solution containing a dispersant, stirring to disperse, and heating to evaporate the solvent to obtain the colored magnetic particles comprises:

adding 20-30 parts of the oil-phase solution to 100-200 parts of an aqueous solution containing 0.1-1 part of a dispersant, stirring to disperse, and heating to 70-90° C. to evaporate the solvent to obtain the colored magnetic particles.

the step of mixing the modified nano ferric oxide, a polymer, a second solvent, and a dye to form an oil-phase solution; adding the oil-phase solution into an aqueous solution containing a dispersant, stirring to disperse, and heating to evaporate the solvent to obtain the colored magnetic particles comprises:

mixing 1.5-3 parts of the modified nano ferric oxide, 10-30 parts of a monomer, 3-5 parts of a dye, and 0.2-0.6 parts of an initiator, stirring at 65-75° C. at a speed of 600-800 rpm for 80-100 minutes until the reaction is complete to obtain the colored magnetic particles.

The above embodiments provide a detailed explanation of each preparation step based on the mass parts of the materials.

In the preparation of nano-magnetite ($Fe_3O_4$) particles, the process begins by dissolving 16-20 parts of iron salts in 300-500 parts of water, followed by stirring to obtain a homogeneous iron salt mixed solution. Stirring during dissolution facilitates the complete dissolution of the iron salts, ensuring uniform distribution of iron ions. The dissolved iron salts supply $Fe^{2+}$ and $Fe^{3+}$ ions, which form the basis for generating the magnetite precursor. Subsequently, 100-140 parts of an alkaline substance are slowly added to the iron salt solution under stirring conditions to control the reaction rate and temperature. During this step, the reaction temperature is maintained between 60° C. and 80° C., and the pH is controlled between 8.5 and 11. These conditions ensure a smooth precipitation reaction, resulting in a uniform magnetite precursor precipitate. Controlling the temperature and pH within this range optimizes the particle size and distribution of the precipitate, thereby obtaining nano-sized magnetite particles.

After completing the precursor precipitation, 1-2 parts of oleic acid are added to the precipitate solution, followed by stirring at 60° C.-70° C. for 60-120 minutes. Oleic acid acts as a surfactant or dispersant, modifying the surface of the magnetite particles to enhance their dispersibility in oil-based solvents. The stirring time and temperature are critical to ensuring the completeness of the reaction; insufficient reaction time may result in incomplete surface modification, while excessive time may lead to unnecessary by-products. After the reaction, the resulting product is washed with 250-400 parts of the first solvent, 2-4 times, to remove unreacted oleic acid and other impurities, and then dried to obtain modified nano-magnetite. The washing step not only removes excess oleic acid but also improves the purity and dispersibility of the particles, providing a solid foundation for the subsequent dyeing process.

During the preparation of the oil-phase solution, 1.5-3 parts of modified nano-magnetite, 10-20 parts of polymer, 40-50 parts of the second solvent, and 3-5 parts of dye are mixed to form the oil-phase solution. The polymer helps enhance the adhesion and stability of the final particles, while the second solvent improves the solubility and mixing efficiency of the dye. By mixing these components in proportion, a uniform oil-phase solution is formed, ensuring the dye and polymer are evenly distributed on the surface of the nano-magnetite particles.

Subsequently, the oil-phase solution is added to an aqueous solution containing a dispersant under stirring to achieve dispersion. The dispersant improves the dispersibility of the magnetite particles, preventing agglomeration. Preferably, the dispersant in the aqueous solution has a mass value of 0.1-1 part, while water has a mass value of 100-200 parts. During dispersion, the solvent gradually evaporates under stirring, with the temperature raised to 70° C.-90° C. to facilitate solvent evaporation. The heating process not only accelerates solvent evaporation but also aids in uniformly attaching the dye to the surface of the magnetite particles, ultimately yielding colored magnetite particles. Solvent evaporation ensures that the final particles have stable solid content and improved dispersibility.

In another method, the modified nano-magnetite, monomer, dye, and initiator are mixed and stirred at a preset temperature until the reaction is complete. The mass values for this process are as follows: 1.5-3 parts of modified nano-magnetite, 10-30 parts of monomer, 3-5 parts of dye, and 0.2-0.6 parts of initiator. In this process, the monomer can be methyl methacrylate (MMA), styrene, or similar compounds, while the dye reacts with the monomer to form a composite. At a temperature of 65° C.-75° C., with a stirring speed of 600-800 rpm, the reaction is conducted for 80-100 minutes. These reaction conditions ensure tighter binding between the monomer and the magnetite particles, resulting in colored magnetite particles with excellent structural stability and uniform dispersibility. The initiator triggers the polymerization reaction, facilitating the chemical bonding between the monomer and the magnetite particles for stronger adhesion.

This invention, through precise control of material mass values, temperature, pH, stirring speed, and other conditions in each step, ensures that the prepared colored magnetite particles exhibit outstanding dispersibility, color stability, and magnetism. By combining surface modification and dyeing technologies, high-quality colored magnetite particles are obtained, which can be widely applied in magnetic coatings, magnetic writing boards, and other magnetic material fields, offering broad market prospects.

Preferably the iron salt comprises two or more of ferrous sulfate, ferric chloride, and ferrous chloride; the alkaline substance comprises one or both of ammonia water and alkali metal hydroxides. The use of ferrous sulfate, ferrous chloride, and ferric chloride effectively provides the required iron ions to form the magnetite precursor precipitate under various reaction conditions. Ferrous sulfate dissolves at relatively low reaction temperatures and supplies divalent iron ions, which contribute to the formation of magnetite nanoparticles with excellent magnetic properties. Ferric chloride, on the other hand, provides trivalent iron ions, ensuring the necessary oxidation state for the synthesis of magnetite. Preferably, by adjusting the ratio of these two iron salts, the composition and structure of magnetite can be precisely controlled, thereby optimizing the magnetic properties of the particles.

Preferably, the alkaline substance includes one or a combination of ammonia water and alkali metal hydroxides. Ammonia water or alkali metal hydroxides serve as the alkaline substance to adjust the pH of the solution, ensuring uniform precipitation of iron ions during the reaction and preventing the formation of by-products. Ammonia water is milder and suitable for synthesis processes requiring lower pH conditions, while alkali metal hydroxides provide stronger alkalinity, facilitating rapid precipitation of magnetite at higher temperatures. This ensures an efficient reaction and high product purity. By rationally selecting and combining these materials, it is possible to regulate the morphology, size, and magnetic properties of magnetite under various process conditions, thereby achieving excellent results in the preparation of magnetic particles.

Preferably, the first solvent is ethanol. After the oleophilic modification of the magnetite particle surface, ethanol, as a polar solvent, can effectively dissolve oleophilic substances such as oleic acid and remove unreacted impurities through washing. This ensures the purity and surface uniformity of the modified magnetite nanoparticles. Additionally, ethanol has low volatility and good solubility, enabling efficient solvent exchange at appropriate temperatures while maintaining particle stability.

Preferably, the second solvent is one or more selected from dichloromethane (DCM), acetone, ethyl acetate, butanone, n-pentane, and n-hexane. These solvents exhibit excellent solubility and volatility, making them effective for dissolving polymers, dyes, and other oil-based substances. During the formation of the oil-phase solution, these solvents provide the necessary solvation to uniformly disperse polymers and dyes in the solution, preventing particle aggregation. In subsequent dispersion processes, their high volatility allows for rapid evaporation during heating, facilitating solvent removal and ensuring that the resulting colored magnetic particles have superior dispersibility and stability.

Preferably, the polymer includes one or more selected from polystyrene (PS), polymethyl methacrylate (PMMA), polypropylene (PP), polyethylene (PE), high-density polyethylene (HDPE), polycarbonate (PC), and polyethylene terephthalate (PET). The selection of these polymers enhances the performance and stability of the colored magnetic particles.

Polystyrene (PS) offers excellent mechanical strength and processability, providing strong particle support and stability during the dyeing process.

Polymethyl methacrylate (PMMA) exhibits outstanding transparency and UV resistance, improving the appearance and durability of the particles.

Polypropylene (PP) and Polyethylene (PE) possess strong chemical resistance and exceptional wear resistance, making them suitable for magnetic particles used in harsh environments, thus enhancing particle durability.

High-Density Polyethylene (HDPE) features high density and tensile strength, contributing to improved stability and uniformity of the particles.

Polycarbonate (PC) demonstrates high impact resistance and excellent thermal stability, ensuring that the dyed magnetic particles resist breakage or deformation during use.

Polyethylene Terephthalate (PET): A polymer with high mechanical strength and heat resistance, ideal for applications requiring robust stability.

The application of these polymers in the preparation of colored magnetic particles provides superior surface properties, enhanced stability, and ensures the high performance and long-term durability of the dyed magnetic particles during use.

Preferably, the dye includes one or more selected from oil-soluble red dye, oil-soluble blue dye, oil-soluble green dye, pearlescent powder, and modified pearlescent powder. The use of these dyes helps achieve rich color effects and excellent appearance performance in the dyed magnetic particles.

Oil-soluble dyes (red, blue, green): These dyes possess strong solubility and color stability, ensuring that the magnetic particles have vibrant and long-lasting colors. The oil-soluble dyes dissolve well in the oil phase solution, providing a uniform dyeing effect and avoiding common issues such as uneven particles or fading colors during the dyeing process. Their strong solubility in the oil phase solution helps enhance the adhesion of the dye to the surface of the magnetic particles, improving their lightfastness and abrasion resistance.

Pearlescent powder and modified pearlescent powder: These powders further enhance the appearance of the dyed magnetic particles by imparting a pearlescent luster, creating a unique visual effect. Pearlescent powder has excellent reflective properties, allowing it to alter the way light is reflected off the particle surface, resulting in a rich variation of colors. It is particularly suitable for applications requiring high-end decorative effects. Modified pearlescent powder undergoes surface treatment to improve its stability and weather resistance during use, significantly enhancing the particle's surface gloss and extending its lifespan.

By selecting different types of dyes and pearlescent powders, it is possible to customize the appearance of the dyed magnetic particles, meeting the diverse needs of color and visual effects for various applications, thus increasing the product's competitiveness in the market.

Preferably, the dispersant includes one or more selected from polyvinyl alcohol (PVA), arabic gum, sodium dodecyl sulfate (SDS), sodium carboxymethyl cellulose (CMC), and polyvinylpyrrolidone (PVP). The use of these dispersants helps improve the dispersion and stability of the magnetic particles in aqueous solutions, preventing particle aggregation or precipitation, thus ensuring uniformity and quality during the preparation process.

Polyvinyl alcohol (PVA): is a commonly used dispersant, PVA has excellent hydrophilicity and adhesive properties, which effectively reduce the agglomeration of magnetic particles and enhance the compatibility between the particles and the aqueous solution, ensuring the magnetic particles remain well-dispersed in water.

Arabic gum is a naturally sourced polymer with good dispersibility and low toxicity, arabic gum forms stable colloidal solutions in water. By providing a certain viscosity, it helps prevent the magnetic particles from aggregating or precipitating in water, maintaining uniform dispersion of the particles.

Sodium dodecyl sulfate (SDS) is a common anionic surfactant with excellent cleaning, dispersing, and emulsifying properties. SDS forms stable micelle structures in water, adsorbing on the surface of magnetic particles, reducing the inter-particle attraction, and effectively preventing particle aggregation. SDS is particularly suitable for systems requiring strong dispersing effects and significantly promotes the dispersion and stability of the particles.

Sodium carboxymethyl cellulose (CMC) is a high-molecular-weight water-soluble material with good thickening, dispersing, and stabilizing effects. CMC enhances the affinity between the particles and the solution by forming electrostatic interactions with the particle surface, preventing aggregation in the solution and maintaining the stability of the dispersion system.

Polyvinylpyrrolidone (PVP) is a polymer with good water solubility, PVP effectively enhances the dispersion of particles in the solution. Through interactions between its polymer chain and the particle surface, PVP prevents particle precipitation and aggregation, maintaining uniform distribution and improving particle stability. PVP also has good solubility and low toxicity, making it suitable for dispersions requiring high stability.

By selecting these dispersants, the dispersion state of the particles can be adjusted according to actual needs, improving the uniformity of particle distribution during the preparation process and enhancing the performance and quality of the final product.

Preferably, the monomers include one or more selected from methyl methacrylate (MMA), styrene, acrylic acid (AA), acrylates (such as ethyl acrylate), acrylonitrile (AN), and epoxy acrylates (such as epoxy acrylate chloride). These monomers help enhance the properties of the magnetic particles during the preparation process, providing improvements in their stability, durability, and color properties.

Methyl methacrylate (MMA) is known for its excellent transparency and high mechanical strength, MMA, when combined with magnetic $Fe_3O_4$ particles, can increase the hardness and wear resistance of the particles, ensuring their stability and longevity in applications. Additionally, MMA has good affinity with dye molecules, effectively improving the coloring effect and color fastness of the particles.

Styrene provides good thermal stability and processing performance. When polymerized with $Fe_3O_4$ particles, styrene imparts high rigidity and impact resistance to the particles. Its strong lipophilicity also improves particle dispersion, especially in oil phase Acrylic acid has strong hydrophilicity and excellent dispersibility. When polymerized, acrylic acid can form a hydrophilic shell around the particles, improving their dispersion and preventing aggregation, ensuring stability in aqueous media. Acrylates, with their ester group chemistry, enhance the interaction between the particles and dyes, thereby improving dye adhesion and coloring performance.

Acrylonitrile (AN) is known for its excellent chemical corrosion resistance, acrylonitrile enhances the chemical stability and heat resistance of the particles when polymerized with $Fe_3O_4$. This improves the particles' resistance to oxidation and acid-base environments, extending their service life.

Epoxy acrylates such as epoxy acrylate chloride are highly chemically reactive monomers that can form stable chemical bonds with magnetic particles and other molecules during polymerization. They help improve the chemical stability and durability of the particles, and their strong adhesion enhances the bonding of dyes to the particle surface, thereby improving the coloring effect.

By selecting the appropriate combination of these monomers, it is possible to tailor the properties of the magnetic particles, ensuring better dispersion, stability, and durability in various applications.

Preferably, the initiators include one or more selected from potassium persulfate (KPS), azobisisobutyronitrile (AIBN), benzoyl peroxide (BPO), ammonium persulfate (APS), tert-butyl peroxide (TBP), and hydrogen peroxide ($H_2O_2$). These initiators help enhance the polymerization process and improve the physical and chemical properties of the colored magnetic particles.

Potassium persulfate (KPS) and ammonium persulfate (APS): These water-soluble initiators efficiently generate sulfate radicals in aqueous systems, ensuring that the polymerization reaction proceeds uniformly. They also improve the hydrophilicity and dispersibility of the particles, making them suitable for aqueous media.

Azobisisobutyronitrile (AIBN) and benzoyl peroxide (BPO): These oil-soluble initiators exhibit excellent initiating ability in non-aqueous or oily media. They significantly enhance the hydrophobicity and mechanical properties of the particles. AIBN, with its moderate decomposition temperature and high reactivity, is ideal for use under various polymerization conditions. BPO, with its high thermal stability and good monomer compatibility, provides a stable source of radicals at elevated temperatures, improving the thermal stability and chemical resistance of the particles.

Tert-butyl peroxide (TBP): As a high-temperature oil-soluble initiator, TBP generates radicals stably under high-temperature conditions, helping to improve the uniformity and high-temperature resistance of the particles.

Hydrogen peroxide ($H_2O_2$): When used in combination with catalysts (such as $Fe^{2+}$), hydrogen peroxide forms a highly active radical system that can rapidly initiate polymerization reactions. It also allows for precise control of particle size and distribution by adjusting the amount of hydrogen peroxide used.

By selecting these initiators, the polymerization process can be flexibly adapted to different reaction conditions. They also improve the chemical stability, mechanical strength, and environmental adaptability of the particles, resulting in colored magnetic particles with excellent physical and chemical properties, suitable for a wide range of applications.

In summary, the preparation method for colored magnetic particles in the embodiment of the present invention involves several key steps to ensure the quality and performance of the final product. The process begins with the synthesis of ferrite ($Fe_3O_4$) particles through a co-precipitation method, where iron salts and alkaline substances are used to generate a ferrite precursor solution. This step yields uniform and high-purity $Fe_3O_4$ particles.

To enhance the particles' hydrophobicity and improve their dispersion and stability in organic systems, oleic acid is introduced for surface modification. The first solvent is then used for washing and drying, further improving the purity and chemical stability of the particles.

The method utilizes two distinct processes to prepare the colored magnetic particles:

Oil-phase method: Modified ferroferric oxide particles are mixed with polymers, solvents, and dyes to form an oil-phase solution. After stabilizing the system with a dispersant, the solvent is evaporated under heating, resulting in colored magnetic particles. This process effectively controls the particle size and distribution while imparting excellent coloring and optical properties to the particles.

Polymerization method: In this approach, modified ferroferric oxide particles are mixed with monomers, dyes, and initiators to undergo a polymerization reaction, resulting in colored magnetic particles. This method allows for the polymeric coating of the particle surface, enhancing the particles' wear resistance, weather resistance, and mechanical properties.

Overall, this method is simple and efficient, yielding colored magnetic particles with excellent dispersion, stability, and functionality. The prepared particles exhibit enhanced performance in various applications, making this method highly suitable for industrial and commercial use.

The following specific examples and comparative examples provide further clarification of the present embodiment 2. Unless otherwise specified, the raw materials mentioned in these embodiments and comparative examples can be sourced from commercially available products. The instruments used, unless otherwise specified, are also commercially available. The processes described, unless otherwise specified, are standard methods commonly selected by those skilled in the art.

Example 01

(1) Preparation of Nano Ferric Oxide

Dissolve 6 g of ferrous sulfate and 10 g of ferric chloride in 300 g of water and stir until the iron salt mixture is homogeneous.

Under stirring conditions, slowly add 100 g of alkaline substance into the iron salt mixture. During the reaction, control the temperature at 80° C. and maintain the pH at 8.5 to obtain a ferric oxide precursor precipitation solution.

Add 2 g of oleic acid to the ferric oxide precursor precipitation solution, and stir at 300 rpm for 60 minutes at 80° C. until the reaction is complete. Then wash the mixture twice with 300 g of the first solvent and dry it to obtain modified nano ferric oxide with an average particle size of 3 nm.

(2A) Solvent Evaporation Method to Prepare Colored Magnetic Particles

1) Preparation of Oil Phase

Mix 1.5 g of the modified nano ferric oxide, 10 g of polymer, 60 g of second solvent, and 5 g of dye (red), and stir at 700 rpm for 25 minutes at room temperature to form the oil phase solution.

2) Evaporation Method to Prepare Colored Magnetic Particles

Add 20 g of the oil phase solution to 200 g of aqueous solution containing 1 g of dispersant, and stir at 700 rpm for 60 minutes at 35° C. to disperse the solution. Then, heat the mixture to 70° C. and evaporate the solvent to obtain the colored magnetic particles. These are the colored magnetic particles.

Figure 18:
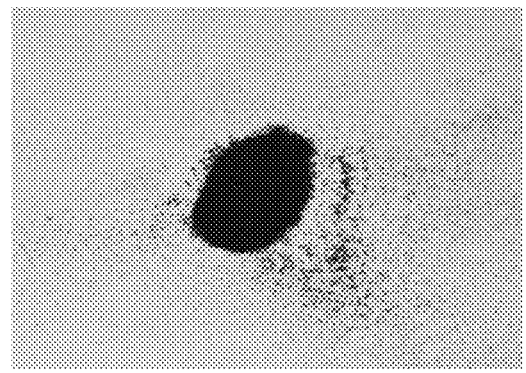
FIG. 18 is a schematic diagram of the colored magnetic particles prepared by the solvent evaporation method in Example 01 of the present invention.

As shown in FIG. 18, it is a schematic diagram of the colored magnetic particles prepared by the solvent evaporation method in Example 01. In FIG. 18, the colored magnetic particles appear red, with stable color and high saturation, showing no obvious color unevenness or discoloration. Regarding particle morphology, the particle size is uniform, and the dispersion is good.

(2B) Direct Preparation with Polymer Monomers

Mix 2 g of the modified nano ferric oxide, 10 g of monomer, 5 g of dye, and 0.2 g of initiator, and stir at 700 rpm for 90 minutes at 70° C. until the reaction is complete to obtain the colored magnetic particles. These are the colored magnetic particles.

Figure 19:
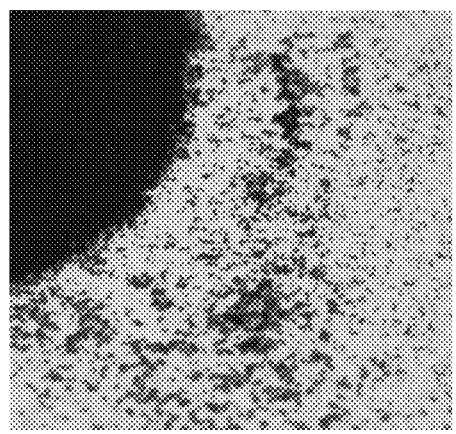
FIG. 19 is a schematic diagram of the colored magnetic particles prepared by the polymer monomer direct method in Example 01 of the present invention.

As shown in FIG. 19, the overall hue of the colored magnetic particles is blue, with high color purity and saturation. Regarding particle morphology, the particle size is uniform, and no obvious agglomeration or adhesion is observed between the particles, indicating good dispersion.

Example 02

(1) Preparation of Nano Ferric Oxide ($Fe_3O_4$)

Dissolve 6 g of ferrous sulfate and 12 g of ferric chloride in 400 g of water and stir until the iron salt mixture is homogeneous.

Under stirring conditions, slowly add 120 g of alkaline substance into the iron salt mixture. During the reaction, control the temperature at 70° C. and maintain the pH at 9 to obtain a ferric oxide precursor precipitation solution.

Add 1 g of oleic acid to the ferric oxide precursor precipitation solution, and stir at 300 rpm for 60 minutes at 70° C. until the reaction is complete. Then wash the mixture twice with 300 g of the first solvent and dry it to obtain modified nano ferric oxide with an average particle size of 3 nm.

(2A) Solvent Evaporation Method to Prepare Colored Magnetic Particles

Preparation of Oil Phase

Mix 3 g of the modified nano ferric oxide, 15 g of polymer, 40 g of second solvent, and 3 g of dye, and stir at 700 rpm for 25 minutes at room temperature to form the oil phase solution.

Evaporation Method to Prepare Colored Magnetic Particles

Add 25 g of the oil phase solution to 150 g of aqueous solution containing 0.5 g of dispersant, and stir at 700 rpm for 60 minutes at 35° C. to disperse the solution. Then, heat the mixture to 70° C. and evaporate the solvent to obtain the colored magnetic particles. These are the colored magnetic particles.

Figure 20:
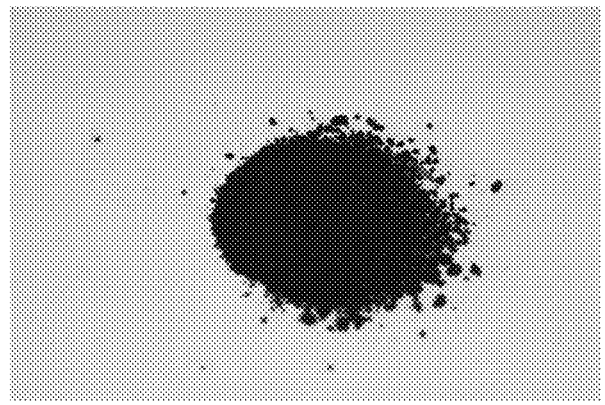
FIG. 20 is a schematic diagram of the colored magnetic particles prepared by the solvent evaporation method in Example 02 of the present invention.

As shown in FIG. 20, the schematic diagram illustrates the colored magnetic particles prepared using the solvent evaporation method in Example 02. In FIG. 20, the colored magnetic particles appear red, exhibiting a deep hue with high saturation and stable coloration. The color performance is outstanding, with no noticeable unevenness or impurities. Regarding particle morphology, the particle size is uniform, and no significant agglomeration or adhesion between particles is observed, indicating good dispersion.

(2B) Direct Preparation with Polymer Monomers

Mix 2 g of the modified nano ferric oxide, 20 g of monomer, 4 g of dye (blue), and 0.4 g of initiator, and stir at 700 rpm for 90 minutes at 70° C. until the reaction is complete to obtain the colored magnetic particles. These are the colored magnetic particles.

Figure 21:
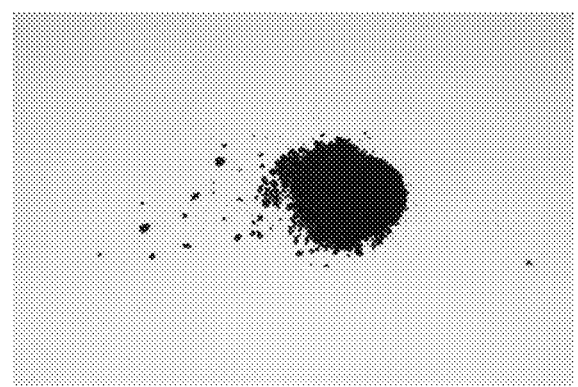
FIG. 21 is a schematic diagram of the colored magnetic particles prepared by the polymer monomer direct method in Example 02 of the present invention.

As shown in FIG. 21, the schematic diagram illustrates the colored magnetic particles prepared by the direct polymer monomer method in Example 02. In FIG. 21, the colored magnetic particles appear blue, exhibiting uniform and stable coloration with high saturation and excellent color performance. Regarding particle morphology, the particle size is uniform, and the particles demonstrate good dispersion.

Example 03

(1) Preparation of Nano Ferric Oxide ($Fe_3O_4$)

Dissolve 6 g of ferrous sulfate and 14 g of ferric chloride in 500 g of water and stir until the iron salt mixture is homogeneous.

Under stirring conditions, slowly add 140 g of alkaline substance into the iron salt mixture. During the reaction, control the temperature at 60° C. and maintain the pH at 11 to obtain a ferric oxide precursor precipitation solution.

Add 1.5 g of oleic acid to the ferric oxide precursor precipitation solution, and stir at 300 rpm for 60 minutes at 60° C. until the reaction is complete. Then wash the mixture twice with 300 g of the first solvent and dry it to obtain modified nano ferric oxide with an average particle size of 3 nm.

(2A) Solvent Evaporation Method to Prepare Colored Magnetic Particles

Preparation of Oil Phase

Mix 2 g of the modified nano ferric oxide, 20 g of polymer, 50 g of second solvent, and 4 g of dye, and stir at 700 rpm for 25 minutes at room temperature to form the oil phase solution.

Evaporation Method to Prepare Colored Magnetic Particles

Add 30 g of the oil phase solution to 100 g of aqueous solution containing 0.1 g of dispersant, and stir at 700 rpm for 60 minutes at 35° C. to disperse the solution. Then, heat the mixture to 70° C. and evaporate the solvent to obtain the colored magnetic particles. These are the colored magnetic particles.

Figure 22:
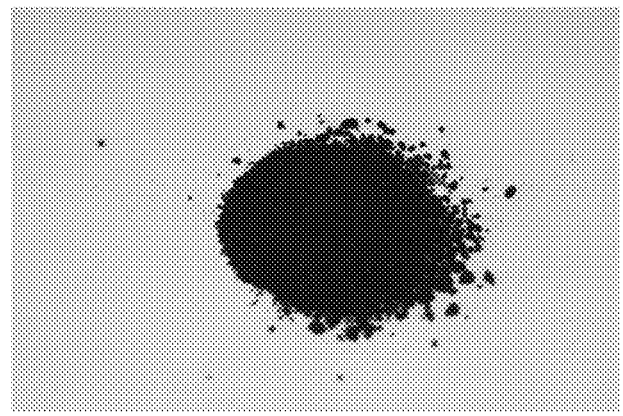
FIG. 22 is a schematic diagram of the colored magnetic particles prepared by the solvent evaporation method in Example 03 of the present invention.

As shown in FIG. 22, the schematic diagram illustrates the colored magnetic particles prepared by the solvent evaporation method in Example 03. In FIG. 22, the colored magnetic particles exhibit a red hue with stable coloration and high saturation, without any noticeable color unevenness or impurities. Regarding particle morphology, the particle size is uniform, and no significant aggregation or adhesion between particles is observed, indicating good dispersion.

Alternatively, (2B) Direct Preparation with Polymer Monomers

Mix 2 g of the modified nano ferric oxide, 30 g of monomer, 3 g of dye (blue), and 0.6 g of initiator, and stir at 700 rpm for 90 minutes at 70° C. until the reaction is complete to obtain the colored magnetic particles. These are the colored magnetic particles.

Figure 23:
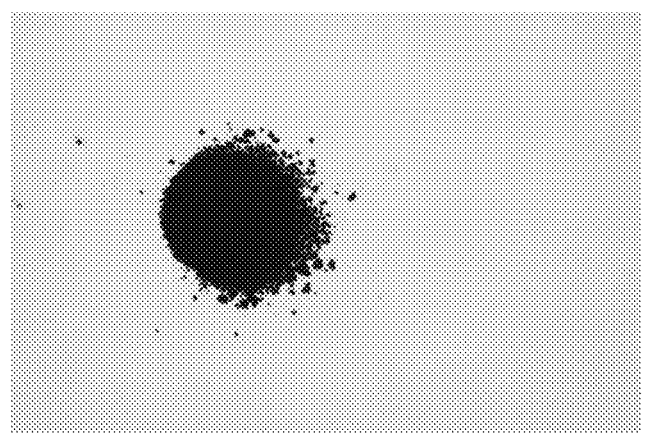
FIG. 23 is a schematic diagram of the colored magnetic particles prepared by the polymer monomer direct method in Example 03 of the present invention.

As shown in FIG. 23, the schematic diagram illustrates the colored magnetic particles prepared by the direct polymer monomer method in Example 03. In FIG. 23, the colored magnetic particles appear blue, with stable coloration and relatively high saturation. The dye is evenly distributed within the particles, and no noticeable color unevenness or impurities are observed. Regarding particle morphology, the particle size is uniform, and no significant aggregation or adhesion between particles is seen, indicating good dispersion.

Comparative Example 01

(1) Preparation of Nano Ferric Oxide ($Fe_3O_4$)

Dissolve 6 g of ferrous sulfate and 10 g of ferric chloride in 300 g of water and stir until the iron salt mixture is homogeneous.

Under stirring conditions, slowly add 100 g of alkaline substance into the iron salt mixture. During the reaction, control the temperature at 80° C. and maintain the pH at 8.5 to obtain a ferric oxide precursor precipitation solution.

Add 0.5 g of oleic acid to the ferric oxide precursor precipitation solution, and stir at 300 rpm for 60 minutes at 80° C. until the reaction is complete. Then wash the mixture twice with 300 g of the first solvent and dry it to obtain modified nano ferric oxide with an average particle size of 3 nm.

(2A) Solvent Evaporation Method to Prepare Colored Magnetic Particles

Preparation of Oil Phase

Mix 2 g of the modified nano ferric oxide, 5 g of polymer, 30 g of second solvent, and 2 g of dye (red), and stir at 700 rpm for 25 minutes at room temperature to form the oil phase solution.

Evaporation Method to Prepare Colored Magnetic Particles

Add 20 g of the oil phase solution to 200 g of aqueous solution containing 0.05 g of dispersant, and stir at 700 rpm for 60 minutes at 35° C. to disperse the solution. Then, heat the mixture to 70° C. and evaporate the solvent to obtain the colored magnetic particles. These are the colored magnetic particles.

Figure 24:
FIG. 24 is a schematic diagram of the colored magnetic particles prepared by the solvent evaporation method in Comparative Example 01 of the present invention.

As shown in FIG. 24, the schematic diagram illustrates the colored magnetic particles prepared by the solvent evaporation method in Comparative Example 01. The overall tone of the colored magnetic particles is dark and lacks brightness, with low saturation, resulting in poor color quality. Some adhesion or aggregation between the particles is observed, indicating poor dispersion.

(2B) Direct Preparation with Polymer Monomers

Mix 2 g of the modified nano ferric oxide, 5 g of monomer, 3 g of dye (blue), and 0.1 g of initiator, and stir at 700 rpm for 90 minutes at 70° C. until the reaction is complete to obtain the colored magnetic particles. These are the colored magnetic particles.

Figure 25:
FIG. 25 is a schematic diagram of the colored magnetic particles prepared by the polymer monomer direct method in Comparative Example 01 of the present invention.

As shown in FIG. 25, the schematic diagram illustrates the colored magnetic particles prepared by the polymer monomer direct method in Comparative Example 01. The overall tone of the colored magnetic particles is blue, and the color saturation is relatively good. However, some adhesion or aggregation between the particles is observed, indicating poor dispersion.

Through the experiments of Example 01, Example 02, and Example 03, color-stable, uniformly sized, and well-dispersed colored magnetic particles were obtained.

In Example 01, by controlling the reaction temperature (80° C.), pH value (8.5), and adding an appropriate amount of oleic acid for surface modification, combined with the solvent evaporation method and direct polymer monomer method, balanced performance colored magnetic particles were obtained. In Example 02, by moderately lowering the reaction temperature (70° C.), increasing the amount of alkaline substance, and optimizing the ratio of polymer and dye, the color of the colored magnetic particles became more uniform, the particle size distribution more stable, and the dispersion further improved. Example 03 further adjusted the reaction conditions, controlling the temperature to 60° C. and the pH value to 11, combined with optimized monomer and dispersant amounts, ensuring that the resulting colored magnetic particles had excellent dispersion.

In contrast, in Comparative Example 01, although similar reaction conditions and methods were used, the lack of optimization in the iron salt mixture ratio, oleic acid content, polymer, and dispersant amounts led to significant deficiencies in the obtained colored magnetic particles. Specifically, the particle size distribution was uneven, with some particles aggregating, resulting in poor dispersion performance. Moreover, the color stability and uniformity of the colored magnetic particles were lower than those of the samples from Example 01, Example 02, and Example 03.

In summary, through the comparative experiments of Example 01, Example 02, and Example 03, this invention effectively improves the dispersion, color uniformity, and stability of colored magnetic particles by optimizing the iron salt mixture ratio, alkaline substance amount, temperature, pH value, and oleic acid modification conditions. In contrast, the preparation process of Comparative Example 01 failed to achieve the same level of performance.

Figure 26:
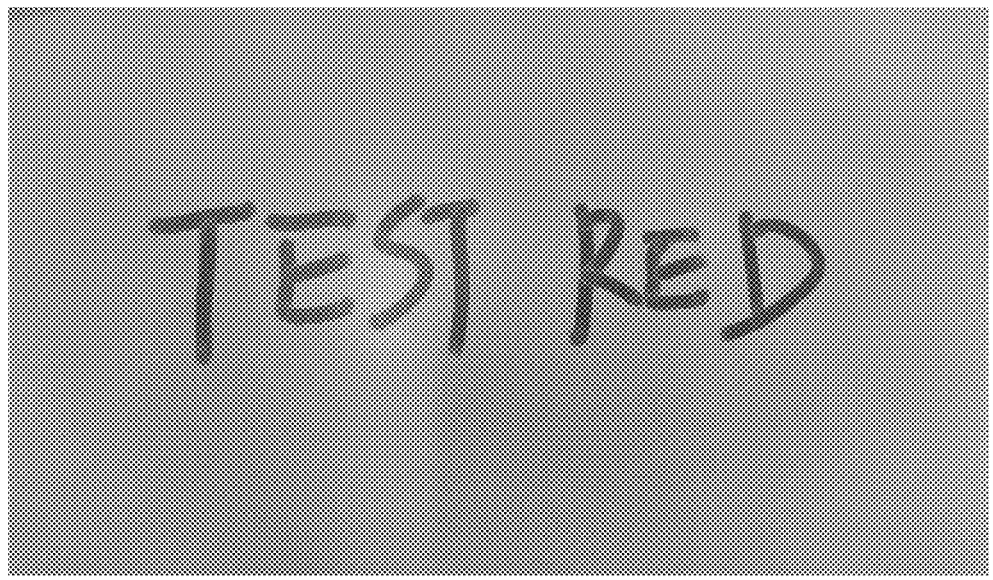
FIG. 26 is a schematic diagram of magnetic film prepared by the colored magnetic particles in the embodiment 2 of the present invention.
Figure 27:
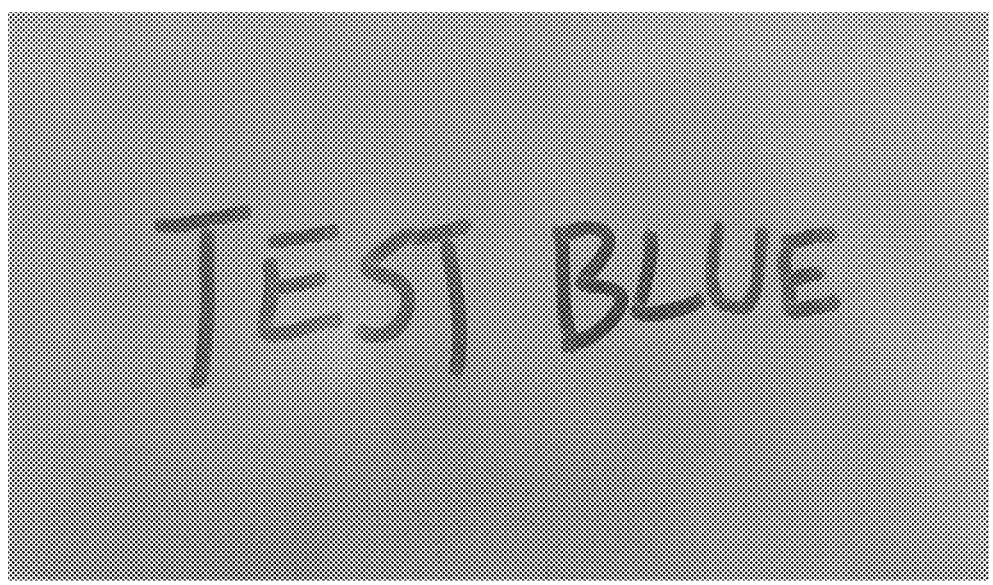
FIG. 27 is a schematic diagram of magnetic film prepared by the colored magnetic particles in the embodiment 2 of the present invention.

As shown in FIG. 26 and FIG. 27, compared to the magnetic film made from black magnetic particles, the colored magnetic films shown in FIG. 9 and FIG. 10 exhibit more attractive colors and visual effects, significantly enhancing visual appeal and improving user experience.

The technical features of the above embodiments can be combined in any way. For the sake of simplicity, not all possible combinations of the technical features from the above embodiments are described. However, as long as there is no contradiction in the combination of these features, they should be considered within the scope of this disclosure.

It should also be noted that the exemplary embodiments mentioned in this invention describe certain methods or systems based on a series of steps or devices. However, the invention is not limited to the order of the steps described above. In other words, the steps can be performed in the order mentioned in the embodiments, or in a different order, or some steps may be performed simultaneously.

The above is merely a specific embodiment of the present invention. Those skilled in the art can clearly understand that, for the sake of convenience and simplicity in description, the specific working processes of the systems, modules, and units described above can be referred to the corresponding processes in the previous method embodiments, which are not elaborated upon here. It should be understood that the scope of protection of the present invention is not limited to this. Any person skilled in the art, within the technical scope disclosed by the present invention, can easily think of various equivalent modifications or substitutions, and these modifications or substitutions should all be covered within the scope of protection of the present invention.

What is claimed is:

1. A magnetic microcapsule, wherein the magnetic microcapsule comprises a wall material and a core material, the wall material is a mixture of an anionic polymer and a cationic polymer, the core material is a mixture of magnetic particles, non-magnetic particles, an oily solvent and a suspension stabilizer, the magnetic particle includes nano-ferric oxide, and also include one or two of oleophilic nano-ferrites and nano-neodymium iron boron, the magnetic strength of nano-ferric oxide, nano-ferrites, and nano-neodymium iron boron are different; the non-magnetic particles are oleophilic nano-titanium dioxide, the cationic polymer and anionic polymer in the wall material are respectively ε-polylysine and gum arabic, the core material comprises nano-magnetite, the nano-sized ferrite, and the nano-titanium dioxide, the oily solvent includes white oil and paraffin, the suspension stabilizer includes one or more of phthalate esters, polyamide wax, polysiloxane, sorbitan oleate, sorbitan monostearate, silicon dioxide, magnesium aluminum silicate, and magnesium lithium silicate.

2. The magnetic microcapsule according to claim 1, wherein the mass ratio of the nano-magnetite, the nano-ferrite, and the nano-titanium dioxide is 1:1.5-3:9, the mass ratio of the white oil to the paraffin is 1:7-9.

3. The magnetic microcapsule according to claim 1, wherein the magnetic microcapsules are spindle-shaped.

4. The magnetic microcapsule according to claim 1, wherein the magnetic particle is prepared by materials comprising modified nano ferric oxide, a second solvent, a dye and a polymer selected from one or more of polystyrene, polymethyl methacrylate, polypropylene, polyethylene, high-density polyethylene, polycarbonate, and polyethylene terephthalate.

5. The magnetic microcapsule according to claim 1, wherein the magnetic the magnetic particle is prepared by materials comprising: nano ferric oxide, a monomer, dye, and an initiator.

6. A preparation method, for preparing the magnetic microcapsule according to claim 1, comprising:
    adding magnetic particles and non-magnetic particles into an oily solvent at a predetermined mass ratio to obtain an oil-phase mixture;
    adding a suspension stabilizer to the oil-phase mixture and dispersing the mixture at a predetermined dispersion speed to obtain a core material suspension;
    adding a cationic polymer and an anionic polymer into deionized water at a predetermined mass ratio to obtain an aqueous solution;
    adding the core material suspension into the aqueous solution, and stirring the mixture to disperse the core material suspension, thereby obtaining a dispersion;
    adding an acid-base regulator to the dispersion to adjust the pH to a predetermined value, reacting for a first predetermined time, then adding a curing agent, and continuing the reaction for a second predetermined time to obtain magnetic microcapsules.

7. The preparation method according to claim 6, wherein the magnetic particle includes nano-ferric oxide, and also include one or two of oleophilic nano-ferrites and nano-neodymium iron boron, the step of adding magnetic particles and non-magnetic particles into an oily solvent at a predetermined mass ratio to obtain an oil-phase mixture comprises:
    adding nano-ferrite, nano-magnetite, and nano-titanium dioxide in a mass ratio of 1:1.5 to 3:9 into the oily solvent to obtain the oil phase mixture, wherein the oily solvent includes a mass ratio of 1:7 to 9 of white oil and paraffin;
    the step of adding a suspension stabilizer to the oil-phase mixture and dispersing the mixture at a predetermined dispersion speed to obtain a core material suspension comprises:
    adding 0.1-2 wt % of suspending stabilizer to the oil phase mixture, dispersing in a high-speed disperser for 60-90 minutes at 25° C. to obtain the core material suspension;
    the step of adding a cationic polymer and an anionic polymer into deionized water at a predetermined mass ratio to obtain an aqueous solution includes:
    adding gelatin and arabic gum to deionized water at a mass ratio of 1:0.8-1.2 to obtain the aqueous solution;

the step of adding the core material suspension into the aqueous solution, and stirring the mixture to disperse the core material suspension, thereby obtaining a dispersion includes:
adding the core suspension to the aqueous solution at a ratio of 1:7-10 and stirring at a speed of 200-800 rpm using a stirring paddle to obtain the dispersion;
the step of adding an acid-base regulator to the dispersion to adjust the pH to a predetermined value, reacting for a first predetermined time, then adding a curing agent, and continuing the reaction for a second predetermined time to obtain magnetic microcapsules includes:
adding glacial acetic acid as an acid-base regulator to the dispersion, adjusting the pH to 4.4-4.5, reacting for 0.5-1 hour, and then adding glutaraldehyde as a cross-linking agent, continuing to for 0.5-1 hour to obtain the magnetic microcapsules.

8. The preparation method according to claim 7, wherein the step of adding 0.1-2 wt % of suspending stabilizer to the oil phase mixture, dispersing in a high-speed disperser for 60-90 minutes at 25° C. to obtain the core material suspension comprises:
adding a mixture of 0.5-0.8 wt % of polyamide wax and sorbitan oleate to the oil-phase mixture, dispersing the mixture in a high-speed disperser at a speed of 1800-2000 rpm for 20-30 minutes under 25° C. conditions,
then adding 0.4-0.8 wt % of a mixture of phthalate ester and polysiloxane and continuing the dispersion at a speed of 1200-1500 rpm for 20-30 minutes under 25° C. conditions,
finally, adding 0.1-0.4 wt % of silica and dispersing at a speed of 1000-1200 rpm for 20-30 minutes under 25° C. conditions to obtain the core material suspension.

9. The preparation method according to claim 6, wherein the magnetic particles are prepared by the following steps:
dissolving an iron salt in water and stirring uniformly to obtain an iron salt mixed solution;
slowly adding an alkaline substance dropwise into the iron salt mixed solution under stirring conditions to obtain a precipitate solution of ferric oxide precursor;
adding oleic acid to the ferric oxide precursor precipitate solution, stirring until the reaction is complete, washing with a first solvent, and drying to obtain modified nano ferric oxide;
mixing the modified nano ferric oxide, a polymer, a second solvent, and a dye to form an oil-phase solution;
adding the oil-phase solution into an aqueous solution containing a dispersant, stirring to disperse, and heating to evaporate the solvent to obtain the colored magnetic particles; or mixing the modified nano ferric oxide, a monomer, a dye, and an initiator, and stirring at a preset temperature until the reaction is complete to obtain the colored magnetic particles.

10. The preparation method according to claim 9, wherein the step of dissolving an iron salt in water and stirring uniformly to obtain an iron salt mixed solution comprises:
dissolving 16-20 parts of iron salt in 300-500 parts of water and stirring uniformly to obtain the iron salt mixed solution.

11. The preparation method according to claim 9, wherein the step of slowly adding an alkaline substance dropwise into the iron salt mixed solution under stirring conditions to obtain a precipitate solution of ferric oxide precursor comprises:
slowly adding 100-140 parts of an alkaline substance dropwise into the iron salt mixed solution under stirring conditions while maintaining the reaction temperature at 60-80° C. and the pH at 8.5-11 to obtain the ferric oxide precursor precipitate solution.

12. The preparation method according to claim 9, wherein the step of adding oleic acid to the ferric oxide precursor precipitate solution, stirring until the reaction is complete, washing with a first solvent, and drying to obtain modified nano ferric oxide comprises:
adding 1-2 parts of oleic acid to the ferric oxide precursor precipitate solution, stirring at 60-80° C. until the reaction is complete, washing 2-4 times with 250-400 parts of a first solvent, and drying to obtain the modified nano ferric oxide.

13. The preparation method according to claim 9, wherein the step of adding the oil-phase solution to an aqueous solution containing a dispersant, stirring to disperse, and heating to evaporate the solvent to obtain the colored magnetic particles comprises:
adding 20-30 parts of the oil-phase solution to 100-200 parts of an aqueous solution containing 0.1-1 part of a dispersant, stirring to disperse, and heating to 70-90° C. to evaporate the solvent to obtain the colored magnetic particles.

14. The preparation method according to claim 9, wherein the step of mixing the modified nano ferric oxide, a polymer, a second solvent, and a dye to form an oil-phase solution;
adding the oil-phase solution into an aqueous solution containing a dispersant, stirring to disperse, and heating to evaporate the solvent to obtain the colored magnetic particles comprises:
mixing 1.5-3 parts of the modified nano ferric oxide, 10-30 parts of a monomer, 3-5 parts of a dye, and 0.2-0.6 parts of an initiator, stirring at 65-75° C. at a speed of 600-800 rpm for 80-100 minutes until the reaction is complete to obtain the colored magnetic particles.

15. The preparation method according to claim 9, wherein the iron salt comprises two or more of ferrous sulfate, ferric chloride, and ferrous chloride; the alkaline substance comprises one or both of ammonia water and alkali metal hydroxides.

16. The preparation method according to claim 9, wherein the dye comprises one or more of oil-soluble red dye, oil-soluble blue dye, oil-soluble green dye, pearlescent powder, and modified pearlescent powder.

17. A magnetic film, wherein the magnetic film comprises: a PET substrate layer, a rubber-based adhesive layer positioned above the PET substrate layer, a mixture layer of water-based adhesive and microcapsules positioned above the rubber-based adhesive layer; and,
an PET film layer positioned above the mixture layer of water-based adhesive and magnetic microcapsules, wherein the magnetic microcapsules are the magnetic microcapsules according to claim 1.

18. The magnetic film according to claim 17, wherein the thickness of the PET film is 0.1-0.14 mm; the aqueous adhesive comprises one or more of PVA aqueous solution, polyurethane, UV absorber, and leveling agent.

* * * * *